US009178546B1

(12) United States Patent
Klemes

(10) Patent No.: US 9,178,546 B1
(45) Date of Patent: Nov. 3, 2015

(54) PHASE-NOISE CANCELLATION APPARATUS AND METHOD

(71) Applicant: Futurewei Technologies, Inc., Plano, TX (US)

(72) Inventor: Marek Klemes, Kanata (CA)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/461,194

(22) Filed: Aug. 15, 2014

(51) Int. Cl.
*H03D 1/04* (2006.01)
*H04B 1/10* (2006.01)
*H04L 1/00* (2006.01)
*H04L 27/38* (2006.01)

(52) U.S. Cl.
CPC ............ *H04B 1/1027* (2013.01); *H04L 1/0036* (2013.01); *H04L 27/38* (2013.01)

(58) Field of Classification Search
CPC ..... H04B 1/1027; H04L 1/0036; H04L 27/38
USPC .......................................................... 375/346
See application file for complete search history.

(56) References Cited

U.S. PATENT DOCUMENTS

| 5,315,618 | A | * | 5/1994 | Yoshida | 375/340 |
| 5,940,450 | A | * | 8/1999 | Koslov et al. | 375/344 |
| 6,151,368 | A | | 11/2000 | Cochran | |
| 7,006,565 | B1 | * | 2/2006 | Endres et al. | 375/233 |
| 2010/0185920 | A1 | * | 7/2010 | Song et al. | 714/758 |

OTHER PUBLICATIONS

Tarighat, A., et al., "Least Mean-Phase Adaptive Filters with Application to Communications Systems," IEEE Signal Processing Letters, vol. 11, No. 2, Feb. 2004, pp. 220-223.
Crawford, J., "Unconventional Phase-Locked Loops Simplify Difficult Designs," U17316, www.aml.us/Local_Papers/.../U17316-Unconventional-PLLs.pdf?CachedSimilar, Nov. 27, 2013, pp. 1-18.
Lyons, R., et al., "The Swiss Army Knife of Digital Networks," IEEEE Signal Processing Magazine, May 2004, pp. 90-98.
Min, S., et al., "A 90-nm CMOS 5-GHz Ring-Oscillator PLL With Delay-Discriminator-Based Active Phase-Noise Cancellation," IEEE Journal of Solid-State-Circuits, vol. 48, No. 5, May 2013, pp. 1151-1160.
Simon, V. et al., "Phase Noise Estimation via Adapted Interpolation," Global Telecommunications Conference 2001, vol. 6, Nov. 25-29, 2001, pp. 3297-3301.
Towfic, Z. J., et al., "Clock Jitter Compensation in Hight-Rate ADC Circuits," IEEE Transactions on Signal Processing, vol. 60, No. 11, Nov. 2012, pp. 5738-5753.

\* cited by examiner

*Primary Examiner* — Juan A Torres
(74) *Attorney, Agent, or Firm* — Slater & Matsil, L.L.P.

(57) ABSTRACT

A noise cancellation method comprises receiving, by an adaptive phase-noise cancellation apparatus, an incoming symbol from a receiver, performing a hard decision process on the incoming symbol to generate a corresponding clean symbol of the incoming symbol, generating a conjugate instance of the corresponding clean symbol, multiplying the orthogonal instance of the incoming symbol by the conjugate instance of the corresponding clean symbol to generate an intermediate component and calculating a phase deviation of the incoming symbol based upon a real part of the intermediate component and an imaginary part of the intermediate component.

23 Claims, 15 Drawing Sheets

PHASE-NOISE CANCELLATION APPARATUS AND METHOD

TECHNICAL FIELD

The present invention relates to a noise cancellation apparatus, and more particularly, to an adaptive phase-noise cancellation apparatus for attenuating phase noise in a digital communication system.

BACKGROUND

Wireless communication systems are widely used to provide voice and data services for multiple users using a variety of access terminals such as cellular telephones, laptop computers and various multimedia devices. Such communications systems can encompass local area networks, such as IEEE 801.11 networks, cellular telephone and/or mobile broadband networks. The communication system can use one or more multiple access techniques, such as Frequency Division Multiple Access (FDMA), Time Division Multiple Access (TDMA), Code Division Multiple Access (CDMA), Orthogonal Frequency Division Multiple Access (OFDMA), Single Carrier Frequency Division Multiple Access (SC-FDMA) and others. Mobile broadband networks can conform to a number of standards such as the main $2^{nd}$-Generation (2G) technology Global System for Mobile Communications (GSM), the main $3^{rd}$-Generation (3G) technology Universal Mobile Telecommunications System (UMTS) and the main $4^{th}$-Generation (4G) technology Long Term Evolution (LTE).

A wireless network may include a wireless device and a plurality of base stations. The wireless device may be a notebook computer, a mobile phone or a Personal Digital Assistant (PDA), a media player, a gaming device or the like. The base stations communicate with the wireless device over a plurality of wireless channels coupled between the wireless device and the base stations (e.g., a downlink channel from a base station to a wireless device). The wireless device may send back information, including channel information, to the base stations over a plurality of reverse channels (e.g., an uplink channel from the wireless device to the base station or a backhaul link between base stations or relay nodes).

The wireless device may include a processor, a transmitter and a receiver. The transmitter may be coupled to one transmit antenna. The receiver may be coupled to a receive antenna. Alternatively, both the transmitter and the receiver are coupled to the same antenna via a duplexer. One major function of the receiver is rejecting unwanted noise such as additive thermal noise and multiplicative phase noise so that a desired signal from a wide spectrum of signals can be recovered.

Unwanted noise may prevent the receiver from correctly recovering a signal. For example, phase noise generated by an oscillator of a local receiver and/or a corresponding remote transmitter may cause the demodulator of the receiver to make incorrect decisions. Such incorrect decisions result in a higher bit error rate (BER), which may cause an unacceptable loss of information and reliability in a digital communication system.

SUMMARY OF THE INVENTION

These and other problems are generally solved or circumvented, and technical advantages are generally achieved, by preferred embodiments of the present invention which provide a system, apparatus and method for reducing phase noise.

In accordance with an embodiment, a method comprises receiving, by an adaptive phase-noise cancellation apparatus, an incoming symbol from a receiver, performing a hard decision process on the incoming symbol to generate a corresponding clean instance of the incoming symbol, generating a conjugate instance of the corresponding clean instance, generating an orthogonal instance of the incoming symbol, multiplying the orthogonal instance of the incoming symbol by the conjugate instance of the corresponding clean instance to generate an intermediate component and calculating a phase deviation of the incoming symbol based upon a complex representation of the intermediate component.

In accordance with another embodiment, an apparatus comprises a first phase deviation estimate block configured to receive a phase-noise corrupted symbol, generate a phase deviation of the phase-noise corrupted symbol at a first output of the first phase deviation estimate block and generate a hard decision instance of the phase-noise corrupted symbol at a second output of the first phase deviation estimate block.

The apparatus further comprises a symbol matched noise reconstruction block having inputs coupled to the first phase deviation estimate block, wherein the symbol matched noise reconstruction block is configured to generate an orthogonal instance of the hard decision instance of the phase-noise corrupted symbol and generate a phase-noise component by multiplying the orthogonal instance of the hard decision instance of the phase-noise corrupted symbol by the phase deviation of the phase-noise corrupted symbol which is adaptively interpolated from the phase deviations of the inner symbols of a QAM constellation.

The apparatus further comprises a symbol matched phase-noise cancellation block having a first input configured to receive the phase-noise corrupted symbol and a second input coupled to an output of the symbol matched noise reconstruction block, wherein the symbol matched noise cancellation block is configured to subtract the phase-noise component from the phase-noise corrupted symbol.

The symbol matched phase-noise cancellation block has a first output generating an output signal substantially free of phase noise. The second output of the symbol matched phase-noise cancellation block sends the output signal to a feedback path in which the residual phase deviation of the output signal is estimated by another phase deviation estimate block and correlated with the phase deviation interpolated from inner symbols. The correlation drives a plurality of tap coefficients of an adaptive filter which refines the phase deviation estimates so as to minimize the residual phase deviation in the output signal.

In accordance with another embodiment, a method comprises receiving, by an adaptive phase-noise cancellation apparatus, an inner symbol from a receiver, wherein the adaptive phase-noise cancellation apparatus is part of a quadrature amplitude modulation (QAM) demodulator of the receiver, generating an orthogonal instance $\tilde{x}_\perp(t)$ of the inner symbol, generating a conjugate instance $x^*(t)$ of a quantized inner symbol and calculating a phase deviation of the inner symbol according to $$\delta\theta_{estimate} = \frac{-\text{Re}\{x^*(t)\cdot \tilde{x}_\perp(t)\}}{\text{Im}\{x^*(t)\cdot \tilde{x}_\perp(t)\}}$$

where $\delta\theta_{estimate}$ is the phase deviation, the inner symbol is selected according to a gating criterion wherein the gating criterion is generated base upon a magnitude squared of the inner symbol.

An advantage of a preferred embodiment of the present invention is eliminating or reducing the phase noise of a quadrature amplitude modulation (QAM) based communication system through an adaptive phase-noise cancellation device.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and do not necessarily represent the physical devices of the various embodiments.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a phase-noise reduction apparatus for a digital communication system with a sixteen quadrature amplitude modulation (16-QAM) modulation scheme. The invention may also be applied, however, to a variety of communication systems with different communication modulation schemes such as higher order QAM modulation schemes and/or the like. Hereinafter, various embodiments will be explained in detail with reference to the accompanying drawings.

Figure 1:
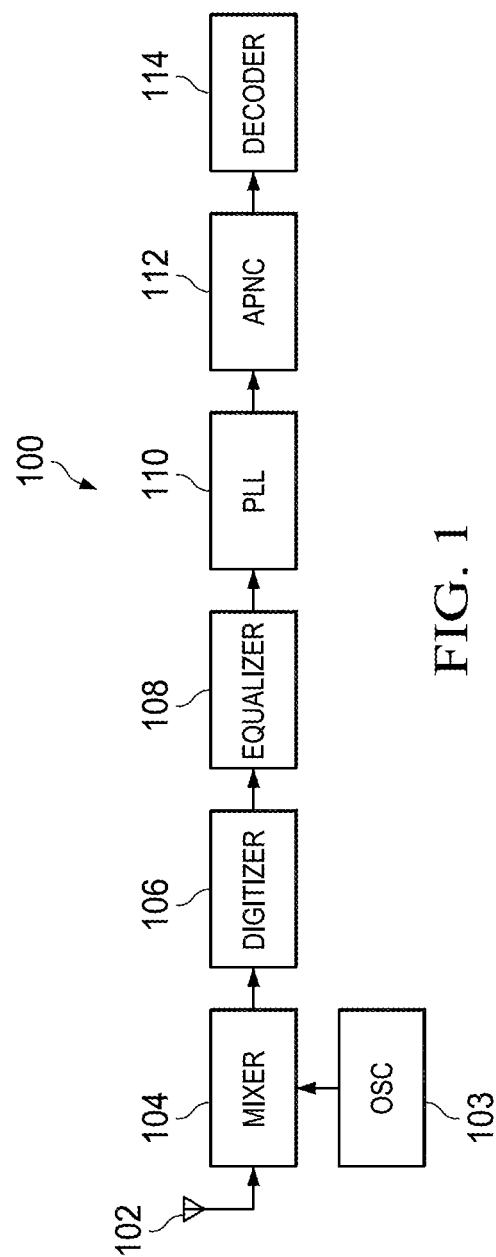
FIG. 1 illustrates a block diagram of a digital communication receiver in accordance with various embodiments of the present disclosure.

FIG. 1 illustrates a block diagram of a digital communication receiver in accordance with various embodiments of the present disclosure. The receiver 100 may be part of a mobile device (not shown) such as a notebook computer, a mobile phone or a Personal Digital Assistant (PDA), a media player, a gaming device and/or the like. Alternatively, the receiver 100 may be part of a fixed digital radio device such as high-speed modems including cable modems, satellite modems, a base station, a backhaul node modem and/or the like.

It should be noted that the digital radio device may comprise other suitable components such as transmitters, antennas and/or the like. For simplicity, only a simplified block diagram of the receiver 100 is shown in FIG. 1.

As shown in FIG. 1, the receiver 100 comprises an antenna 102, an oscillator 103, a mixer 104, a digitizer 106, an equalizer 108, a carrier-recovery phase locked loop (PLL) 110, an adaptive phase-noise cancellation (APNC) device 112 and a decoder 114. The mixer 104, the digitizer 106, the equalizer 108, the PLL 110 and the APNC device 112 are connected in cascade between the antenna 102 and the decoder 114. The oscillator 103 is coupled to the mixer 104.

The antenna 102 is employed to receive wireless signals sent from a transmitter (not shown). The transmitter also generates phase noise and contaminates the wireless signals through the transmitter's oscillators and mixers. Furthermore, the AM-PM nonlinear conversions in the transmitter's power amplifier, the antenna's phase-shifters and/or the like may generate additional phase noise. The total phase noise of the link is seen by a demodulator of a modem (e.g., receiver 100) at the receiving end and becomes part of the objective to be minimized by the APNC device 112.

The receiver 100 may receive wireless signals modulated based upon various standards such as the main $2^{nd}$-Generation (2G) technology Global System for Mobile Communications (GSM), the main $3^{rd}$-Generation (3G) technology Universal Mobile Telecommunications System (UMTS) and the main $4^{th}$-Generation (4G) technology Long Term Evolution (LTE). In addition, the wireless signals may be modulated based upon other standards such as Worldwide Interoperability for Microwave Access (WiMAX), Wireless Local Area Network (WLAN), Ultra Wideband (UWB) and/or the like. Moreover, the wireless signals may be non-standard proprietary signals. Furthermore, the wireless signals received by the receiver 100 may be modulated based upon different modulation techniques such as 16-QAM, 64-QAM, phase-shift keying and/or the like.

The mixer 104 is coupled to the antenna 102 and the oscillator 103. The signal from the antenna 102 and the signal from the oscillator 103 are processed by the mixer 104. The mixer 104 generates a signal having an intermediate frequency (IF) suitable for the subsequent stages (e.g., the decoder 114) of the receiver 100. The IF signal includes a zero IF signal.

In some embodiments, the mixer 104 may comprise a first mixer and a second mixer (not shown respectively). The first mixer is coupled to the oscillator 103. After the received signal has been processed by the first mixer, an in-phase (I) signal having the intermediate frequency is generated and sent to the next stage of the receiver 100.

The second mixer is coupled to the oscillator 103 through a phase shifter (not shown). The phase shifter adds a 90 degree phase shift to the signal generated by the oscillator 103. The second mixer generates a quadrature (Q) signal for digital signal processing in the subsequent stages of the receiver 100.

The antenna 102, the mixer 104 and oscillator 103 may be collectively referred to as the RF front end of the receiver 100. It should be noted that the RF front end in FIG. 1 is provided for illustrative purposes only, and is provided only as an example of the functionality. One of ordinary of skill in the art will realize that the RF front end may comprise other functional blocks such as an impedance matching circuit, a bandpass filter, a low noise amplifier and/or the like.

The digitizer 106 may be implemented as a suitable device such as an analog-to-digital (A/D) converter. The A/D converter converts an analog signal into digital form suitable for subsequent functional blocks (e.g., the decoder 114). The structure and operation principle of the A/D converter described above are well known, and hence are not discussed in further detail herein.

The equalizer 108, the PLL 110, the APNC 112 and the decoder 114 are connected in cascade as shown in FIG. 1. The equalizer 108 is employed to reduce inter-symbol interference. The operation principle of the equalizer 108 is well known, and hence is not discussed in detail herein.

The PLL 110 is employed to track the residual carrier frequency offset of an incoming signal from the equalizer 108. In particular, the PLL 110 may generate a local carrier signal that is phase-locked with the residual carrier frequency offset of the incoming signal sent from the equalizer 108. The synchronization between the incoming signal and the local signal is accomplished by multiplying the incoming signal by the conjugate of the locally-generated carrier signal. In some embodiments, the PLL 110 may function as a feedback control loop, which adaptively tracks the unknown phase and frequency of the incoming signal's carrier and substantially removes them from the signal coming from the equalizer 108 so as to achieve synchronization with the incoming signal.

The synchronized signal generated at the output of the PLL 110 is sent to the APNC 112. The signal is a complex signal synchronized in frequency and locked in phase. In some embodiments, the signal may still be corrupted by untracked residual phase noise. As shown in FIG. 1, the APNC 112 is placed outside the equalizer 108 and the PLL 110. More particularly, the APNC 112 is placed after the equalizer 108 and the PLL 110, but placed before a hard decision device.

The APNC 112 is employed to attenuate the residual phase noise before the noise corrupted signal enters the subsequent stages such as a hard-decision slicer, a decoder and/or the like. The detailed structure of the APNC 112 will be described below with respect to FIGS. 2-15. The operation principle of the APNC 112 will be described below with respect to FIGS. 17-21.

It should be noted that the APNC 112 may be implemented as a field-programmable gate array (FPGA) chip. Alternatively, the APNC 112 may be implemented as other suitable integrated semiconductor circuits such as an application-specific integrated circuit (ASIC) chip and/or the like. Furthermore, the APNC 112 may comprise a processor through which the APNC 112 may communicate with other parts of the receiver 100. The processor may be implemented as a microcontroller and/or the like.

It should further be noted that the APNC 112 may be connected in cascade with other phase-noise elimination devices including multiple instances of itself so as to better reduce the residual phase noise of the receiver 100.

The decoder 114 may be part of the processor of the receiver 100. The processor may be any suitable baseband processors such as a digital signal processor (DSP) chip and/or the like. The processor may be further coupled to other radio device function units such as an application processor and/or the like.

In some embodiments, a sixteen-QAM modulation scheme may be employed for transmitting signals between a transmitter (not shown) and the receiver 100. The sixteen-QAM modulation scheme may comprise sixteen constellation points arranged in rows and columns with equal vertical and horizontal spacing. An exemplary constellation diagram of the sixteen-QAM modulation scheme will be described below with respect to FIG. 16.

In each unit interval of the sixteen-QAM modulation scheme, four bits of data are received by the decoder 114. The four bits comprise in-phase and quadrature signal components of a symbol, each of which utilizes two bits. By detecting the phase and amplitude of the received signal, the QAM demodulator of the receiver 100 is capable of finding a corresponding constellation symbol for the received signal.

Figure 2:
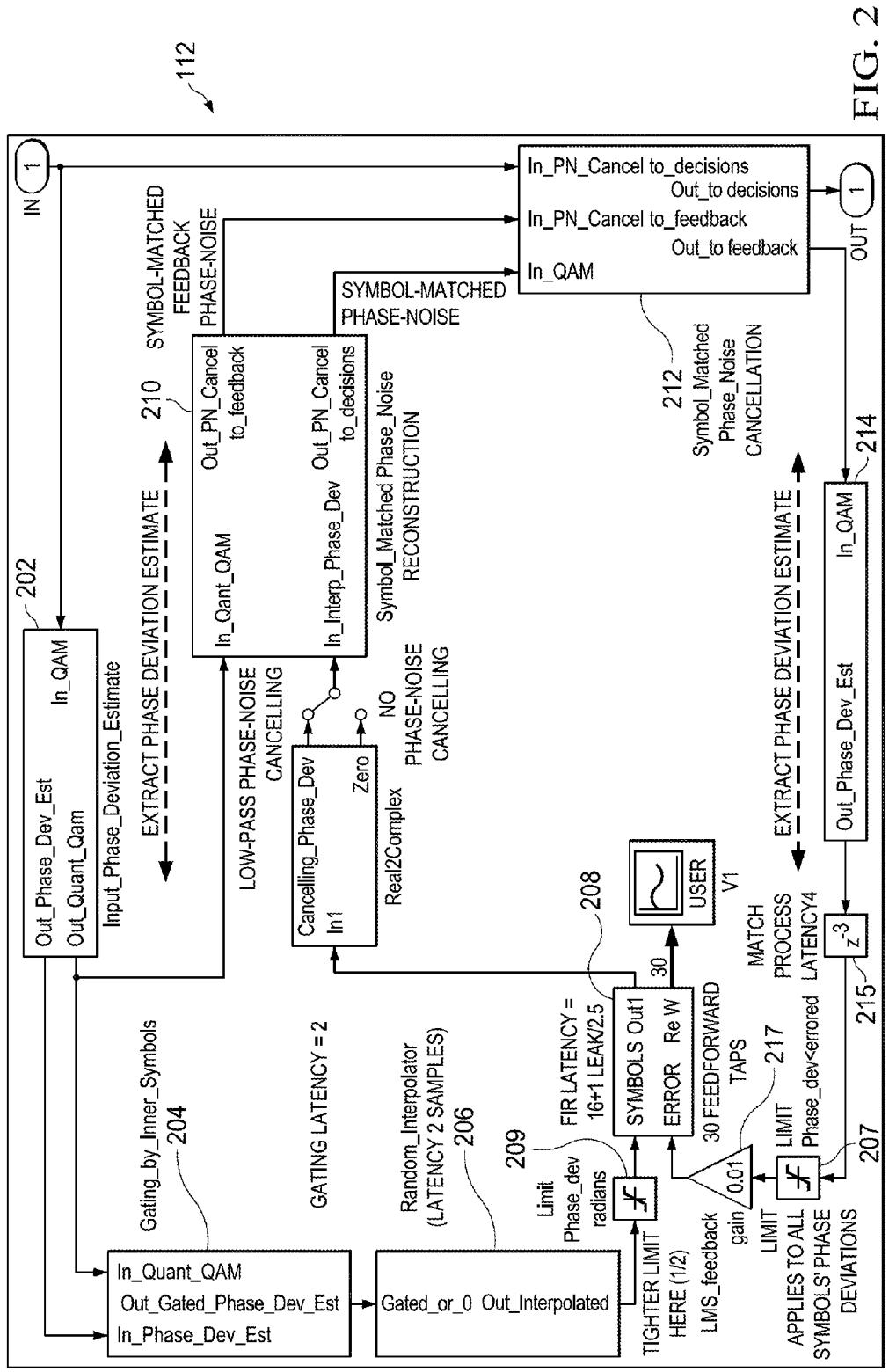
FIG. 2 illustrates a block diagram of the APNC shown in FIG. 1 in accordance with various embodiments of the present disclosure.

FIG. 2 illustrates a block diagram of the APNC shown in FIG. 1 in accordance with various embodiments of the present disclosure. The APNC 112 comprises a first phase deviation estimate block 202, an inner symbol selection and gating block 204, a random interpolator functional block 206, an adaptive phase deviation FIR filter 208, a symbol matched phase-noise reconstruction block 210, a symbol matched phase-noise cancellation block 212 and a second phase deviation estimate block 214.

In some embodiments, the APNC 112 receives a noise-corrupted symbol. The first phase deviation estimate block 202 makes a hard decision based upon the noise-corrupted symbol and generates a substantially clean symbol based upon the hard decision. Furthermore, the first phase deviation estimate block 202 generates a phase deviation based upon the noise-corrupted symbol. The phase deviation flows through the inner symbol selection and gating block 204 and the random interpolator functional block 206 and reaches the adaptive phase deviation FIR filter 208 as shown in FIG. 2. As shown in FIG. 2, there is a limiter 209 between the output of the random interpolator functional block 206 and a first input of the adaptive phase deviation FIR filter 208.

The phase deviation and a feedback signal provided by the second phase deviation estimate block 214 are sent to the adaptive phase deviation FIR filter 208 in which the accuracy of the phase deviation is further improved so that the phase deviation sent to the symbol matched phase-noise reconstruction block 210 approximately matches the real phase deviation of the noise-corrupted symbol. As shown in FIG. 2, a latency block 215, a limiter 207 and a feedback gain stage 217 are connected in cascade between the output of the second phase deviation estimate block 214 and a second input of the adaptive phase deviation FIR filter 208.

The symbol matched phase-noise reconstruction block 210 has a first input receiving the phase deviation from the adaptive phase deviation FIR filter 208 and a second input receiving a substantially clean symbol from the first phase deviation estimate block 202. Such a substantially clean symbol may be alternatively referred to as a hard symbol. The symbol matched phase-noise reconstruction block 210 first generates an orthogonal instance of the hard decision symbol, and then multiplies the orthogonal instance of the hard symbol by the phase deviation to produce a phase error of the noise-corrupted symbol.

The symbol matched phase-noise cancellation block 212 receives the noise-corrupted symbol from the input of the APNC 112 and the phase error sent from the symbol matched phase-noise reconstruction block 210. The phase error is subtracted from the noise-corrupted symbol in the symbol matched phase-noise cancellation block 212. As a result, a substantially phase-noise free symbol is generated at the output of the symbol matched phase-noise cancellation block 212. The symbol matched phase-noise cancellation block 212 may also generate another output signal, which functions as a feedback signal. The feedback signal is sent with minimal delay to the adaptive phase deviation FIR filter 208 through the second phase deviation estimate block 214.

It should be noted that FIG. 1 is a simplified diagram illustrating the structure of the APNC 112 according to an embodiment of the present disclosure. This diagram is merely an example, which should not unduly limit the scope of the claims. One of ordinary skill in the art would recognize many variations, alternatives, and modifications. For example, the gating block 204 may be optional depending on different applications and design needs. Furthermore, the random interpolator functional block 206 may comprise different interpolating or filtering functions. More, the gating block 204 may comprise different gating thresholds and/or different gating criteria.

Figure 3:
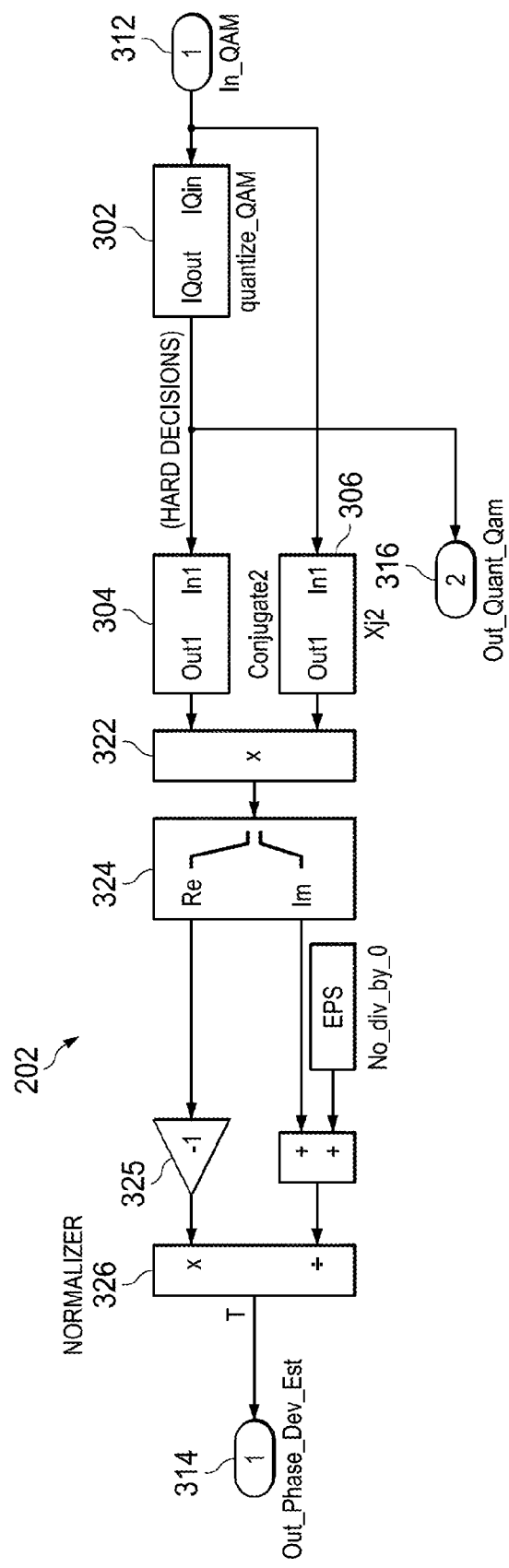
FIG. 3 illustrates a simplified schematic diagram of the first phase deviation estimate block shown in FIG. 2 in accordance with various embodiments of the present disclosure.

FIG. 3 illustrates a simplified schematic diagram of the first phase deviation estimate block shown in FIG. 2 in accordance with various embodiments of the present disclosure. The first phase deviation estimate block 202 comprises a QUANTIZE_QAM functional block 302, a CONJUGATE functional block 304, a XJ functional block 306, a multiplication block 322, a complex number separator 324 and a normalizer 326. The first phase deviation estimate block 202 further comprises an input 312, a first output 314 and a second output 316 as shown in FIG. 3.

The input 312 is used to receive a plurality of QAM symbols. The XJ functional block 306 is employed to generate a corresponding orthogonal instance of a symbol based upon an incoming QAM symbol. The detailed structure of the XJ functional block 306 will be described below with respect to FIG. 6.

The QUANTIZE_QAM functional block 302 is used to find a substantially clean instance of a QAM symbol from a phase-noise-corrupted input QAM symbol. In other words, the QUANTIZE_QAM functional block 302 is used to generate an estimate of a hard decision of the incoming QAM symbol. Based upon the estimate of the hard decision, the substantially clean QAM symbol may be obtained. The substantially clean QAM symbol may be alternatively referred to as a hard symbol throughout the description. The detailed structure of the QUANTIZE_QAM functional block 302 will be described below with respect to FIG. 4.

The output of the QUANTIZE_QAM functional block 302 is sent to the second output 316 and the CONJUGATE functional block 304. A corresponding conjugate instance of a symbol is generated at the CONJUGATE functional block 304. The detailed structure of the CONJUGATE functional block 304 will be described below with respect to FIG. 5.

The multiplier block 322 generates an intermediate result by multiplying the orthogonal symbol (sent from the XJ functional block 306) by the conjugate symbol (sent from the CONJUGATE functional block 304). The intermediate result is sent to the complex number separator 324.

The complex number separator 324 is configured to split the intermediate result into a corresponding real part and a corresponding imaginary part. As shown in FIG. 3, the real part is multiplied by −1 through an inverter 325, and then divided by the imaginary part at the normalizer 326 to produce the phase deviation estimate at the first output 314. Throughout the description, the phase deviation estimate generated at the first output 314 may be alternatively referred to as a phase deviation of a noise corrupted symbol.

Figure 4:
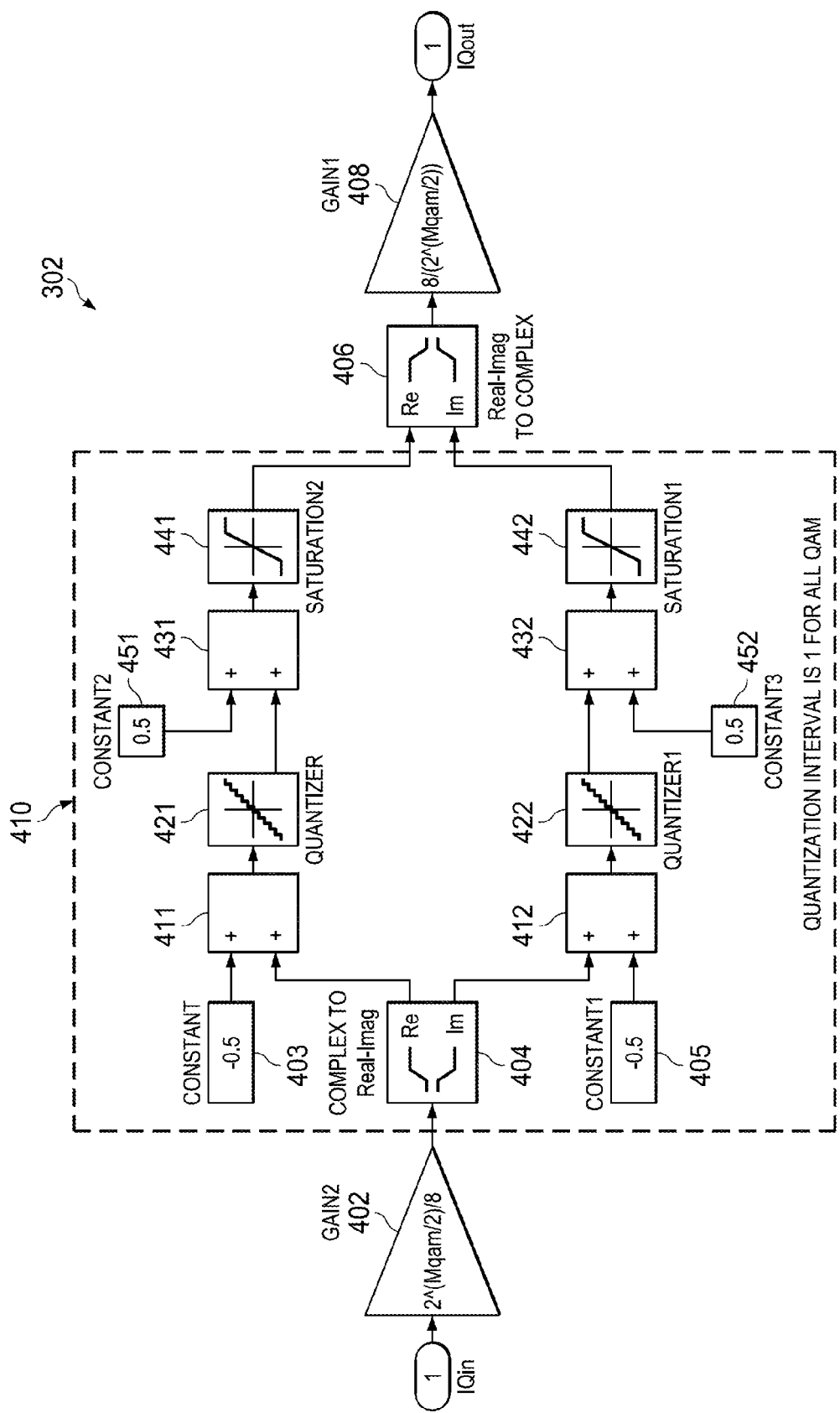
FIG. 4 illustrates a simplified schematic diagram of the QUANTIZE_QAM functional block shown in FIG. 3 in accordance with various embodiments of the present disclosure.

FIG. 4 illustrates a simplified schematic diagram of the QUANTIZE_QAM functional block shown in FIG. 3 in accordance with various embodiments of the present disclosure. The QUANTIZE_QAM functional block 302 comprises a first amplifier 402, a complex number separator 404, an in-phase and quadrature processing circuit 410, a complex number combiner 406 and a second amplifier 408. As shown in FIG. 4, the first amplifier 402, the complex number separator 404, the in-phase and quadrature processing circuit 410, the complex number combiner 406 and the second amplifier 408 are connected in cascade between an input and an output of the QUANTIZE_QAM functional block 302.

The in-phase and quadrature processing circuit 410 comprises an in-phase processing circuit and a quadrature process circuit. The in-phase processing circuit comprises a first adder 411, a first quantizer 421, a second adder 431 and a first level limiter 441. The first adder 411, the first quantizer 421, the second adder 431 and the first level limiter 441 are connected in cascade between a real output of the complex number separator 404 and a real input of the complex number combiner 406. The in-phase and quadrature processing circuit 410 further comprises four constant blocks 403, 405, 451 and 452 as shown in FIG. 4.

Likewise, the quadrature processing circuit comprises a third adder 412, a second quantizer 422, a fourth adder 432 and a second level limiter 442. The third adder 412, the second quantizer 422, the fourth adder 432 and the second level limiter 442 are connected in cascade between an imaginary output of the complex number separator 404 and an imaginary input of the complex number combiner 406.

In some embodiments, an incoming QAM symbol is normalized at the first amplifier 402 in accordance with the size of the QAM symbol constellation in the first amplifier 402. The complex number separator 404 receives the normalized QAM symbol and splits the normalized QAM symbol into a real part and an imaginary part. The real part is alternatively referred to as an in-phase part. The imaginary part is alternatively referred to as a quadrature part.

As shown in FIG. 4, the first adder 411 offsets the real part by subtracting one half the normalized amplitude of the symbol from the real part. The output of the first adder 411 is sent to the first quantizer 421 where the real part is quantized into 1-unit amplitude level. Furthermore, the real part is reverse-offset by adding a one-half normalized amplitude value at the second adder 431. Then, the real part's amplitude is limited by the first level limiter 441 according to a level related to the maximum size of the constellation corner symbols when rotating. As shown in FIG. 4, the circuit for processing the real part and the circuit for processing the imaginary part may be of a same configuration. For simplicity, the operation principle of the circuit for processing the imaginary part is not discussed herein.

The real part and the imaginary part are recombined into a complex symbol at the complex number combiner 406. The complex symbol is sent to the output of the QUANTIZE_QAM functional block 302 through the second (de-normalizing) amplifier 408.

Figure 5:
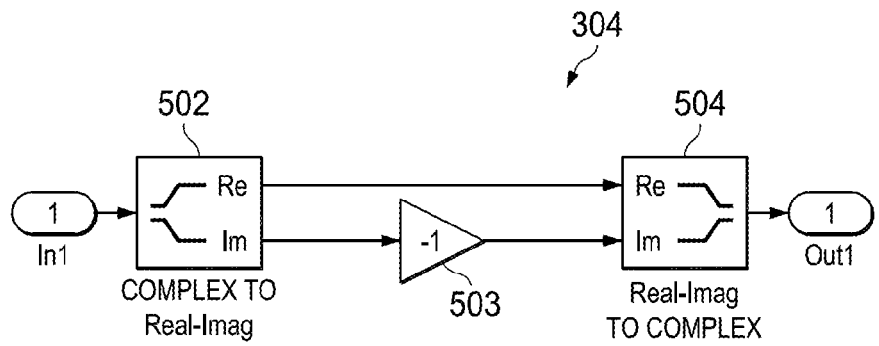
FIG. 5 illustrates a simplified schematic diagram of the CONJUGATE functional block shown in FIG. 3 in accordance with various embodiments of the present disclosure.

FIG. 5 illustrates a simplified schematic diagram of the CONJUGATE functional block shown in FIG. 3 in accordance with various embodiments of the present disclosure. The CONJUGATE functional block 304 comprises a complex number separator 502 and a complex number combiner 504. The complex number separator 502 separates the QAM symbol into a real part and an imaginary part. The imaginary part is inverted by multiplying the imaginary part by −1 through an inverter 503. The complex number combiner 504 recombines the real part and the imaginary part to produce a complex symbol that is passed to the output port of the functional block. In sum, a conjugate instance of a complex symbol may be generated at the output of the CONJUGATE functional block 304.

Figure 6:
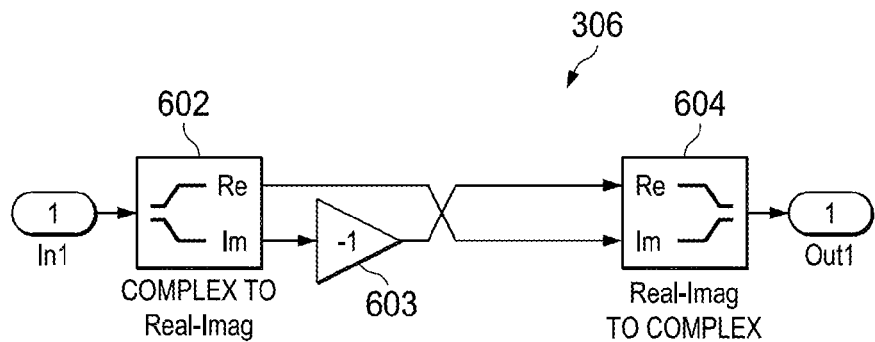
FIG. 6 illustrates a simplified schematic diagram of the XJ functional block shown in FIG. 3 in accordance with various embodiments of the present disclosure.

FIG. 6 illustrates a simplified schematic diagram of the XJ functional block shown in FIG. 3 in accordance with various embodiments of the present disclosure. The XJ functional block 306 comprises a complex number separator 602 and a complex number combiner 604. The complex number separator 602 separates the QAM symbol into a real part and an imaginary part. The imaginary part is inverted by multiplying the imaginary part by −1 through an inverter 603 and sent to the real input of the complex number combiner 604. The real part is sent to the imaginary input of the complex number combiner 604. The complex number combiner 604 recombines the real input and the imaginary input to produce a complex symbol that is passed to the output port of the functional block. In sum, an orthogonal instance of a complex symbol may be generated at the output of the XJ functional block 306.

Figure 7:
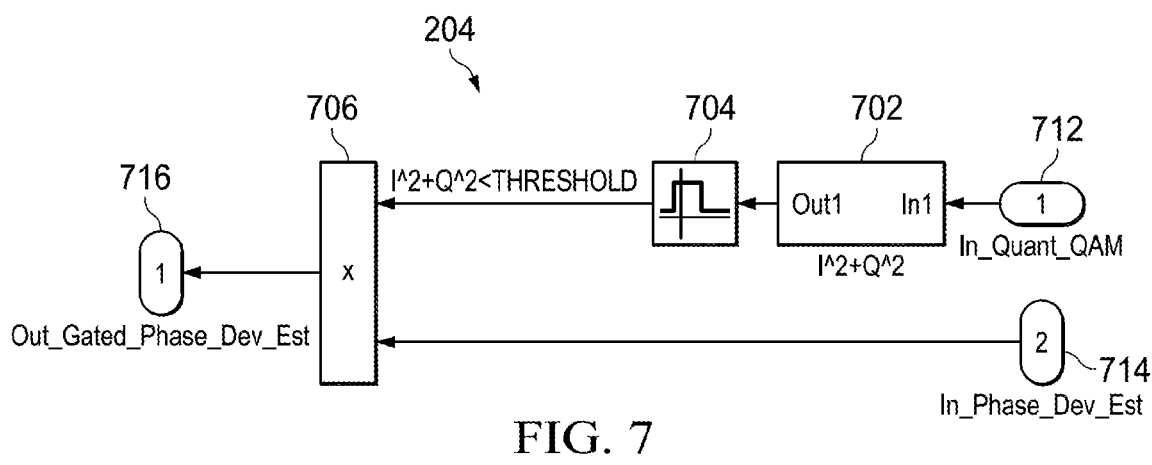
FIG. 7 illustrates a simplified schematic diagram of the inner symbol selection and gating block shown in FIG. 2 in accordance with various embodiments of the present disclosure.

FIG. 7 illustrates a simplified schematic diagram of the inner symbol selection and gating block shown in FIG. 2 in accordance with various embodiments of the present disclosure. The inner symbol selection and gating block 204 comprises an $I^2+Q^2$ functional block 702, a threshold device 704 and a multiplier 706. The first input 712 of the inner symbol selection and gating block 204 is coupled to the second output 316 (shown in FIG. 3) of the first phase deviation estimate block 202. The first input 712 is used to receive the quantized QAM symbols generated by the QUANTIZE_QAM 302 shown in FIG. 3. The second input 714 of the inner symbol selection and gating block 204 is coupled to the first output 314 (shown in FIG. 3) of the first phase deviation estimate block 202. The second input 714 is used to receive the phase deviation estimate generated by the first phase deviation estimate block 202 shown in FIG. 3.

The quantized QAM symbols at the first input 712 is processed by the $I^2+Q^2$ functional block to produce the magnitude squared of the quantized QAM symbols, which is processed by the threshold device 704.

In some embodiments, the threshold device 704 generates a "1" when the magnitude squared of a quantized QAM symbol is between 0 and a predetermined threshold. In some embodiments, the predetermined threshold is defined as the squared magnitude of the largest inner symbol. On the other hand, the threshold device 704 generates a "0" value when the magnitude squared of a quantized QAM symbol is greater than the set threshold. This binary-valued output of the threshold device 704 is then multiplied by the estimated phase deviation of the same symbol received at the second input 714. As shown in FIG. 7, the multiplier 706 generates the multiplication result and forwards it to the output 716 as shown in FIG. 7.

One advantageous feature of having inner symbol selection and gating block is that the threshold device 704 only passes the phase-deviations of the symbols whose squared magnitude is below a threshold corresponding to the magnitude of inner symbols and to substitute "0" for the phase-deviations of the remaining symbols such as outer symbols.

Figure 8:
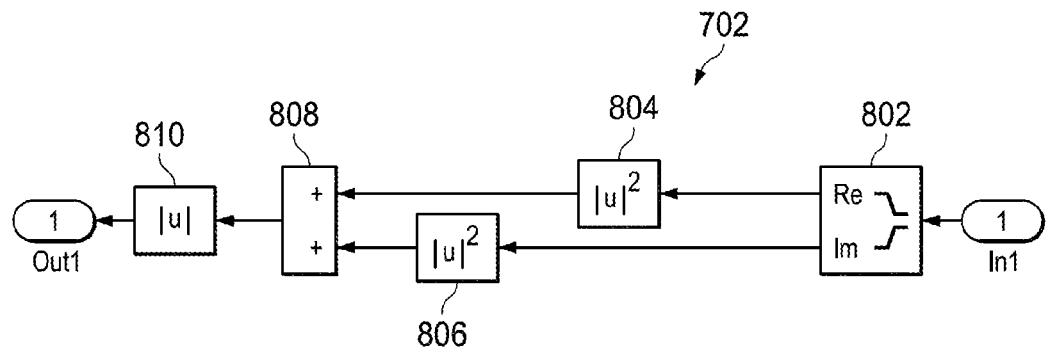
FIG. 8 illustrates a simplified schematic diagram of the $I^2+Q^2$ functional block shown in FIG. 7 in accordance with various embodiments of the present disclosure.

FIG. 8 illustrates a simplified schematic diagram of the $I^2+Q^2$ functional block shown in FIG. 7 in accordance with various embodiments of the present disclosure. The $I^2+Q^2$ functional block 702 comprises a complex number separator 802, a first square calculation block 804, a second square calculation block 806, an adder 808 and an absolute value calculation block 810. As shown in FIG. 8, the complex number separator 802 splits an incoming complex QAM symbol into a real part and an imaginary part. The real part and the imaginary part are further processed by the first square calculation block 804 and the second square calculation block 806 respectively. The square of the real part and the square of the imaginary part are added together at the adder 808. The adder 808 forwards the sum of the square of the real part and the square of the imaginary part to the output of the $I^2+Q^2$ functional block 702 through the absolute value calculation block 810.

It should be noted in theory the absolute value calculation block 810 is not necessary. However, a simulation software tool assumes there is a complex value at the output of the adder 808. As such, the absolute value calculation block 810 is employed to produce a real value at the output of the adder 808.

Figure 9:
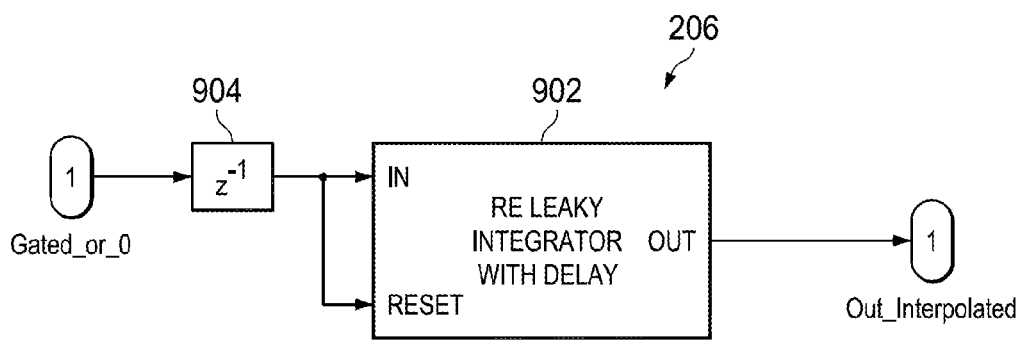
FIG. 9 illustrates a simplified schematic diagram of the random interpolator functional block shown in FIG. 2 in accordance with various embodiments of the present disclosure.

FIG. 9 illustrates a simplified schematic diagram of the random interpolator functional block shown in FIG. 2 in accordance with various embodiments of the present disclosure. The random interpolator functional block 206 comprises a delay stage 904 and a resettable leaky integrator 902. As shown in FIG. 9, the delay stage 904 and the resettable leaky integrator 902 are connected in cascade between the input and output of the random interpolator functional block 206.

As shown in FIG. 9, after an appropriate delay added by the delay stage 904, the incoming signal is split into two signals. One signal goes to the input of the resettable leaky integrator 902. The other signal goes to the reset port of the resettable leaky integrator 902. The reset function of the resettable leaky integrator 902 resets to zero for every non-zero input sample. The leakage of the resettable leaky integrator 902 is accomplished by setting the feedback gain of the resettable leaky integrator 902 to a value less than 1 by a leaked feedback device (shown in FIG. 10). The detailed structure of the leaky integrator will be described below with respect to FIG. 10. The output of the resettable leaky integrator 902 is forwarded to the output of this functional block.

In sum, the random interpolator functional block 206 is employed to obtain the approximation of interpolated phase deviations for every symbol. One advantageous feature of having the random interpolator functional block 206 is the block helps to obtain a linear interpolation of phase-deviations between the phase-deviations of the gated inner symbols. As a result, reasonable estimates of phase-deviations for the outer symbols can be obtained. It should be noted that the resettable leaky integrator cannot be replaced by a regular-interval linear interpolator because gated the inner symbols occur at random intervals.

Figure 10:
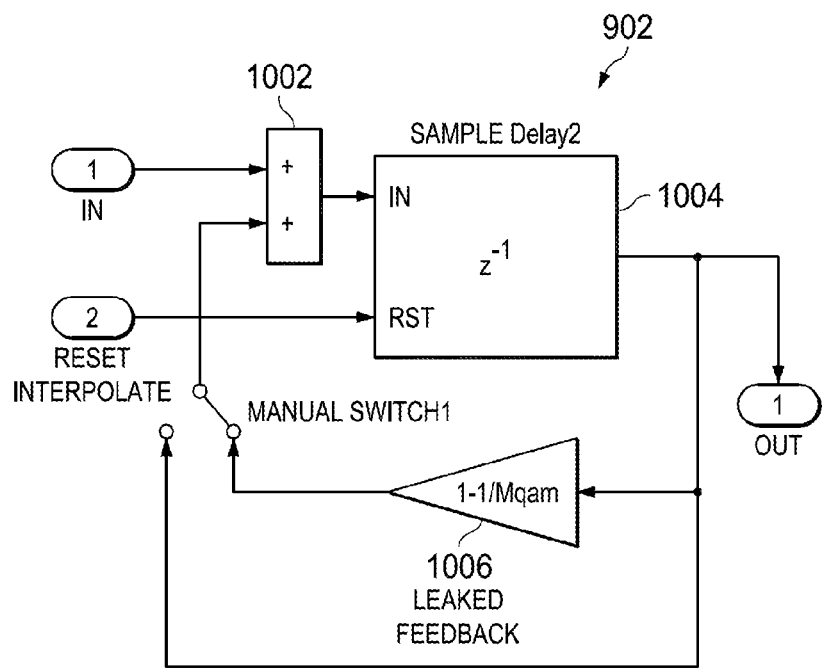
FIG. 10 illustrates a simplified schematic diagram of the resettable leaky integrator shown in FIG. 9 in accordance with various embodiments of the present disclosure.

FIG. 10 illustrates a simplified schematic diagram of the resettable leaky integrator shown in FIG. 9 in accordance with various embodiments of the present disclosure. The resettable leaky integrator 902 comprises an adder 1002, a latch 1004 and a leaked feedback device 1006. The resettable leaky integrator 902 receives a reset signal from the random interpolator functional block 206 shown in FIG. 9. If the sample is a non-zero signal, the latch 1004 is reset. The resettable leaky integrator starts to integrate with a programmable leakage factor.

As shown in FIG. 10, the sample is received at the first input and the reset signal is received at the second input. The sample is sent to a first input of the adder 1002. The output of the adder 1002 is coupled to the input of the latch 1004. In some embodiments, the latch 1004 is implemented as a delay element. The output of the latch 1004 is the output of the resettable leaky integrator 902. Furthermore, the output of the latch 1004 is sent to a second input of the adder 1002 through the leaked feedback device 1006. In some embodiments, the leaked feedback device 1006 is implemented as a feedback amplifier. The gain of the feedback amplifier is set to a quantity inversely-related to the size of the QAM constellation. The reset port of the latch 1004 may be cleared (set to zero) based upon the value at the RST reset port.

Figure 11A:
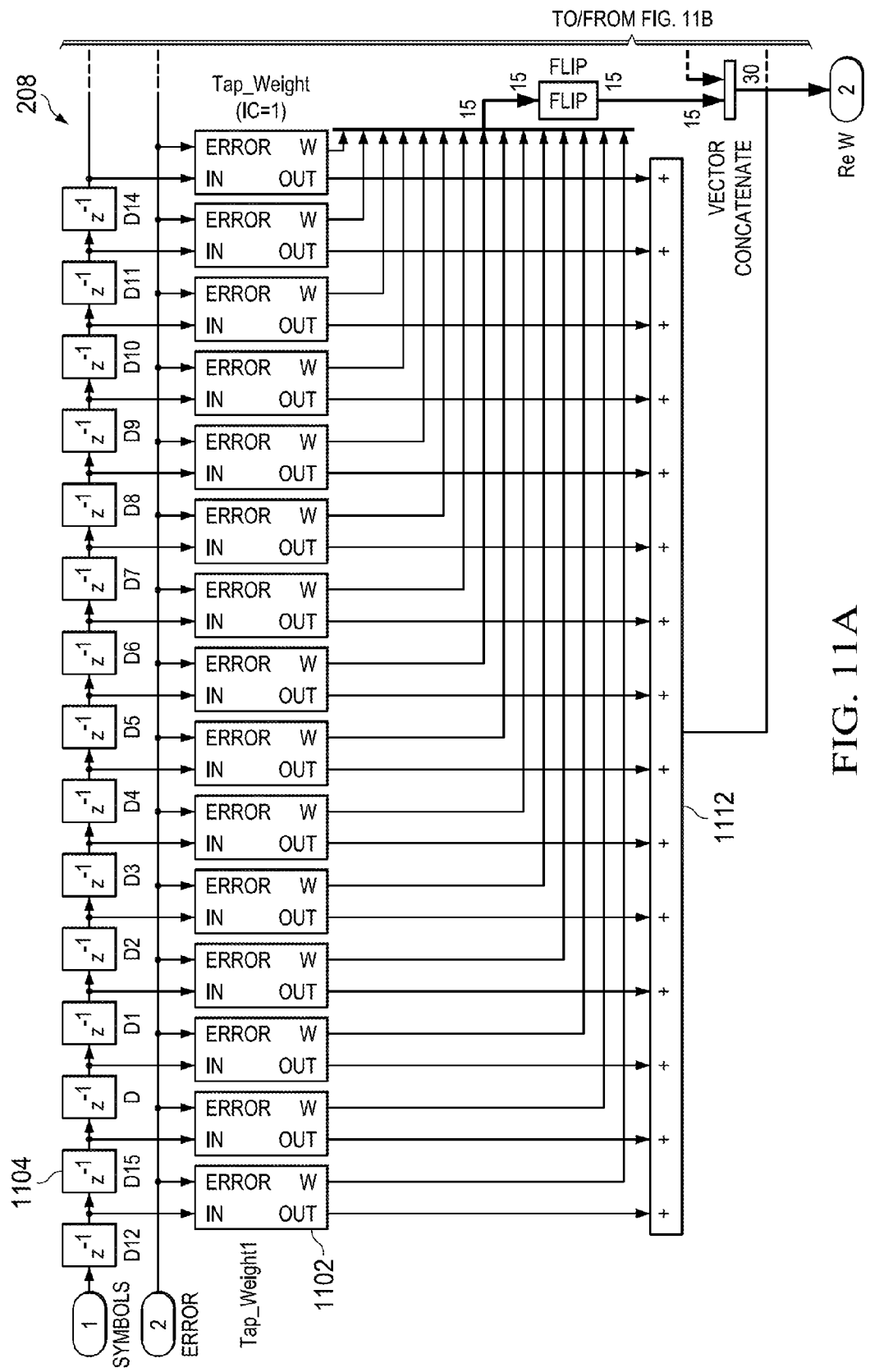
FIG. 11A and FIG. 11B illustrate a simplified schematic diagram of the adaptive phase deviation FIR filter shown in FIG. 2 in accordance with various embodiments of the present disclosure.
Figure 11B:
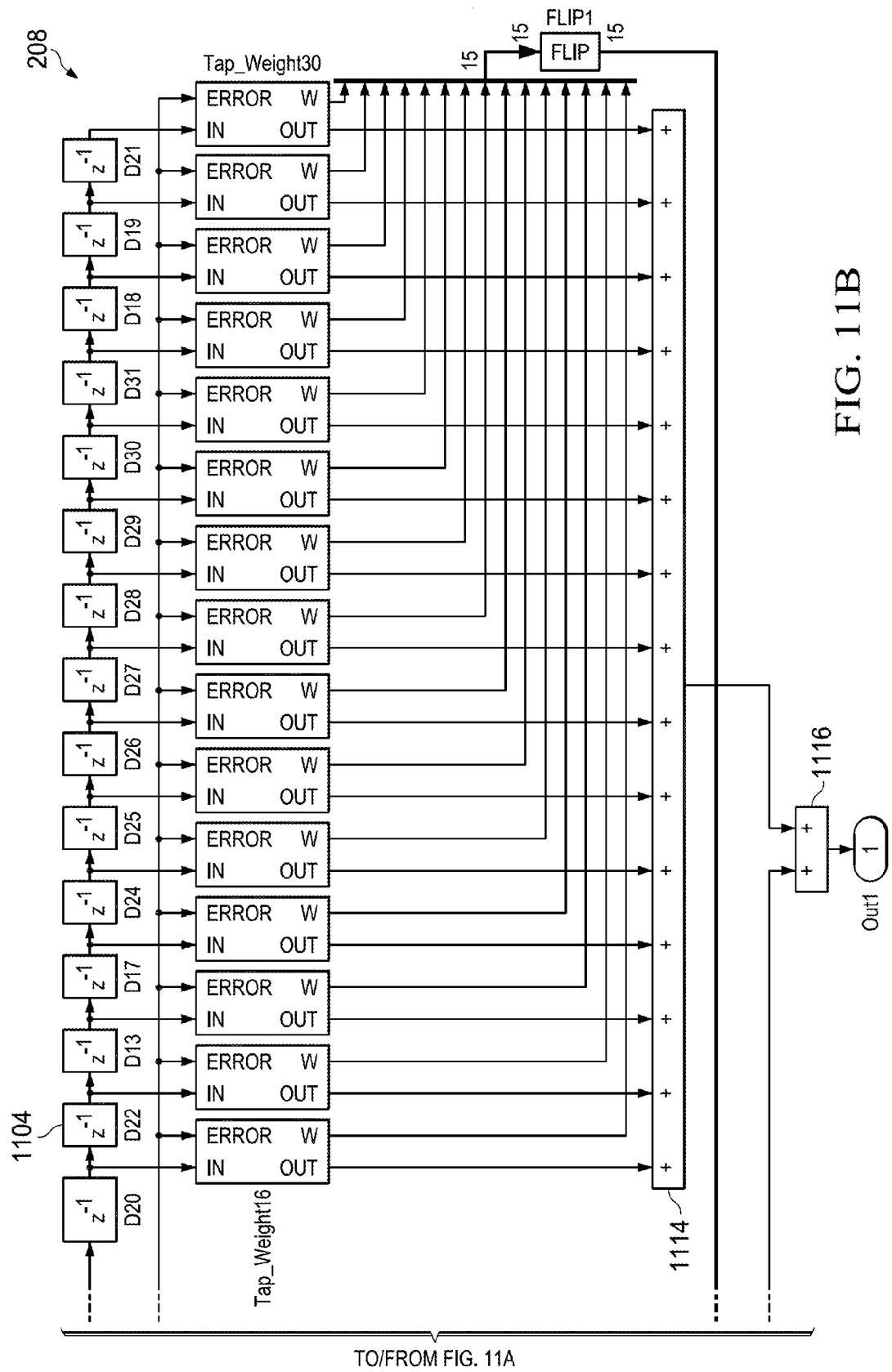

FIG. 11A and FIG. 11B illustrate a simplified schematic diagram of the adaptive phase deviation FIR filter shown in FIG. 2 in accordance with various embodiments of the present disclosure. The adaptive phase deviation FIR filter 208 comprises thirty TAP_WEIGHT functional blocks 1102, thirty delay stages 1104, a first adder 1112, a second adder 1114 and a third adder 1116. It should be noted that the adaptive phase deviation FIR filter 208 including thirty TAP_WEIGHT functional blocks as shown in FIG. 11A and FIG. 11B is merely an example, which should not unduly limit the scope of the claims. The number of the TAP_WEIGHT functional blocks is related to the number of taps in the equalizer. In some embodiments, the number of the TAP_WEIGHT functional blocks is equal to two times the number of taps in the equalizer. In addition, some other factors such as the number of coefficients in pulse-shaping filters (not shown), the depth of the interleaving device, the bandwidth of the phase noise and/or the like may affect the selection of the number of the TAP_WEIGHT functional blocks.

It should further be noted that the TAP_WEIGHT functional blocks 1102 are real-valued tap weights as opposed to complex-valued tap weights. The integrator of the center-most tap weight block is initialized at a positive real value greater than zero. The rest of the tap weight blocks may be initialized at zero.

It should further be noted that while FIG. 11A and FIG. 11B illustrate the adaptive phase deviation FIR filter 208 with three adders, the adaptive phase deviation FIR filter 208 could accommodate any number of adders. In some embodiments, the function of the adaptive phase deviation FIR filter 208 may be accomplished by a single adder.

Referring back to FIG. 2, the symbol input of the adaptive phase deviation FIR filter 208 receives a partially interpolated phase deviation from the random interpolator functional block 206. The error input of the adaptive phase deviation FIR filter 208 receives a feedback error from a feedback loop comprising a symbol matched phase-noise cancellation block 212, a second phase deviation estimate block 214, a match process latency stage, a feedback error limiter and a feedback gate stage as shown in FIG. 2.

The partially interpolated phase deviation flows through a delay line comprising the delay stages 1104. Each output of the delay stage 1104 is coupled to a phase-deviation input of a corresponding TAP_WEIGHT functional block. The feedback error is forwarded to the error input of each TAP_WEIGHT functional block as shown in FIG. 11A and FIG. 11B. A real-valued weighting coefficient is applied to the signal received at the phase-deviation input of each TAP_WEIGHT functional block to generate a weighted phase-deviation.

As shown in FIG. 11A and FIG. 11B, the weighted phase-deviations from the first fifteen TAP_WEIGHT functional blocks are summed together at the first adder 1112. Likewise, the weighted symbols from the second fifteen TAP_WEIGHT functional blocks are summed together at the second adder 1114. The output of the first adder 1112 and the second adder 1114 are added together at the third adder 1116. The detailed structure of the TAP_WEIGHT functional block will be described below with respect to FIG. 12.

One advantageous feature of having the adaptive phase deviation FIR filter 208 is that the adaptive phase deviation FIR filter 208 helps to further improve the approximation of the partially interpolated phase deviation from the random interpolator functional block 206. More particularly, the adaptive phase deviation FIR filter 208 is capable of adaptively filtering the partially interpolated phase deviation based upon the feedback error sent from the feedback output of the symbol-matched phase-noise reconstruction block 210 through symbol matched phase-noise cancellation block 212, the second phase deviation estimate block 214 and suitable gain and delay stages.

The adaptive algorithm controlling the adaptive phase deviation FIR filter 208 is characterized mathematically below. Assume a vector $\theta_k$ denotes the phase deviation at a symbol-interval k referred to as the input to the constrained coefficient of the adaptive phase deviation FIR filter 208. $W_k$ is the vector of real-valued FIR filter coefficients for producing the vector of output phase-deviations used for phase-noise cancellation $W_k^T \theta_k$. The constant constraint vector d=[0, ..., 1$_n$, ... 0]$^T$ denotes an initial condition at the tap n which defines the "quiescent" impulse response of the FIR filter in the absence of any output phase error. Superscript T denotes the vector transpose.

The algorithm is arranged such that the phase-deviation error $e_k = d^T \theta_k - W_k^T \theta_k$. The mean square phase-deviation error may be minimized using the well-known Least Mean Squares (LMS) algorithm according to the following equation:

$$W_K - W_{K-1} = -\mu \theta_K e_K^T = -\mu \theta_K \theta_K^T [d_n - W_K] \quad (1)$$

In Equation (1) above, $\theta_k$ corresponds to $\delta \theta$ (illustrated below with respect to Equation (3)) in the development of the APNC 112, and $W_k^T \theta_k$ corresponds to $\underline{\delta \theta}$. The sampling interval "k" is delayed in accordance with the latency of the APNC 112.

It should be noted the adaptive algorithm described above is merely an example. Other suitable adaptive algorithms may be employed depending on different applications and design needs.

Figure 12:
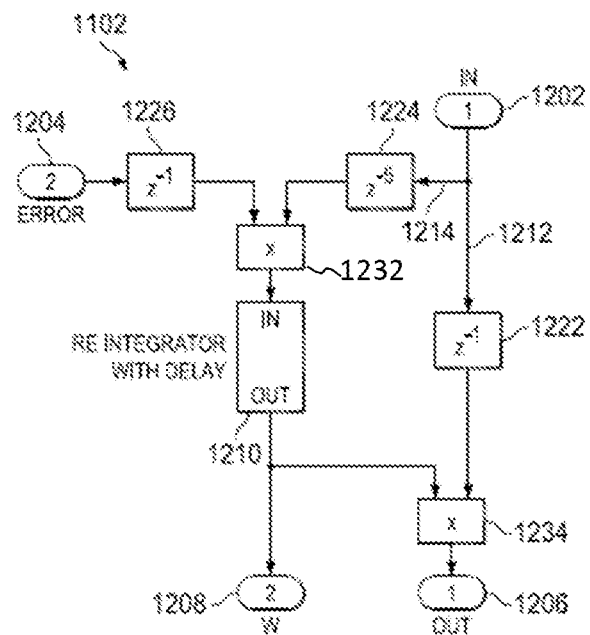
FIG. 12 illustrates a simplified schematic diagram of the TAP_WEIGHT functional block shown in FIG. 11A and FIG. 11B in accordance with various embodiments of the present disclosure.

FIG. 12 illustrates a simplified schematic diagram of the TAP_WEIGHT functional block shown in FIG. 11A and FIG. 11B in accordance with various embodiments of the present disclosure. The TAP_WEIGHT functional block 1102 has a first input 1202 receiving a signal from an output of a delay stage shown in FIG. 11A and FIG. 11B and a second input 1204 receiving a common error feedback signal.

The first input is split into a weighting branch 1212 and a correlating branch 1214. The signal of the correlating branch 1214 is delayed by a compensating delay 1224, and then multiplied by a common error feedback signal in a correlating multiplier 1232. The output of the correlating multiplier 1232 is sent to the leaky integrator 1210.

The signal of the weighting branch 1212 is fed to a first input of a weighting-coefficient multiplier 1234 through a delay stage 1222. The output of the leaky integrator 1210 is sent to the second input of the weighting multiplier 1234. The output of the weighting multiplier 1234 is fed to the first output 1206 of the TAP_WEIGHT functional block 1102.

In some embodiments, the integrator 1210 is a resettable leaky integrator. The output of the integrator 1210 constitutes the weighting coefficient. The output of the integrator 1210 is coupled to the second input of the weighting multiplier 1234 as well as a second output 1208 of the TAP_WEIGHT functional block 1102. The detailed structure of the integrator 1210 will be described below with respect to FIG. 13.

Figure 13:
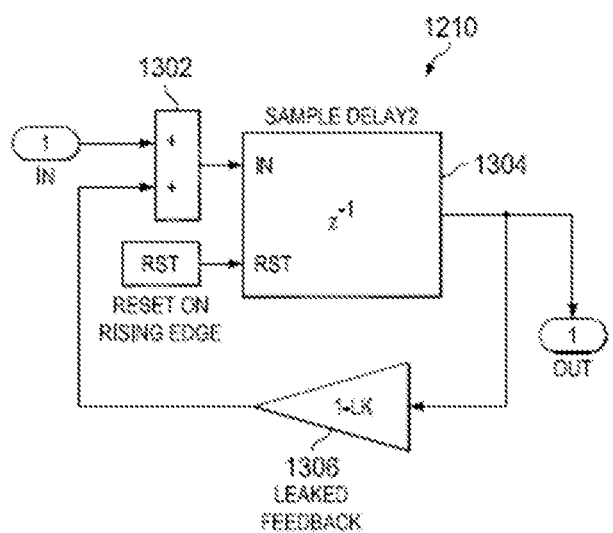
FIG. 13 illustrates a simplified schematic diagram of the leaky integrator shown in FIG. 12 in accordance with various embodiments of the present disclosure.

FIG. 13 illustrates a simplified schematic diagram of the leaky integrator shown in FIG. 12 in accordance with various embodiments of the present disclosure. The leaky integrator 1210 comprises an adder 1302, a latch 1304 and a leaked feedback device 1306. The operation principle of the leaky integrator 1210 shown in FIG. 13 is similar to that shown in FIG. 10 except that the RESET input is optional. The leaky integrator 1210 is operated manually and not dependent on input signals. In some embodiments, the gain of the feedback device 1306 is equal to "1-LK" and LK is the leak.

Figure 14:
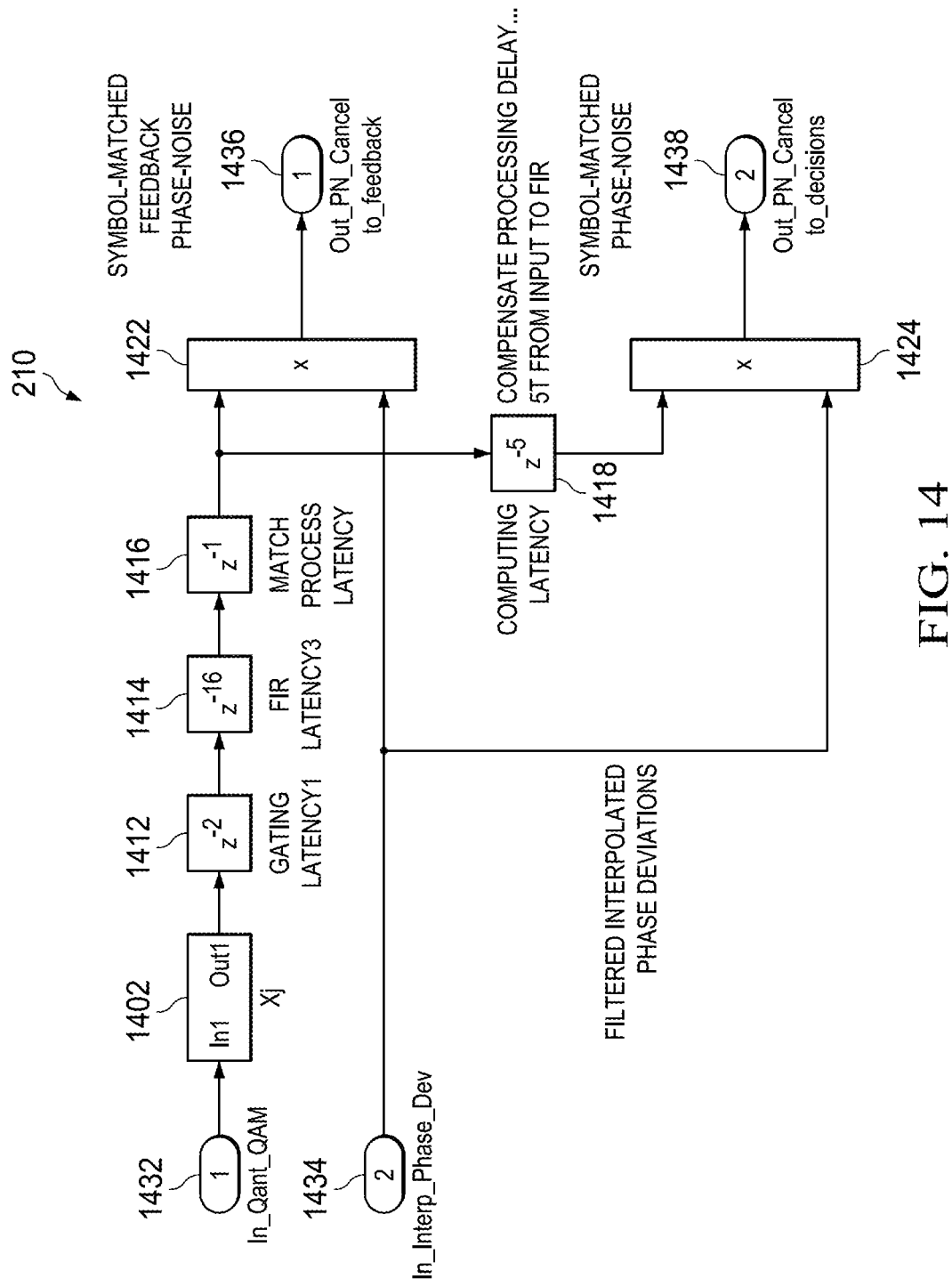
FIG. 14 illustrates a simplified schematic diagram of the symbol matched phase-noise reconstruction block shown in FIG. 2 in accordance with various embodiments of the present disclosure.

FIG. 14 illustrates a simplified schematic diagram of the symbol matched phase-noise reconstruction block shown in FIG. 2 in accordance with various embodiments of the present disclosure. The symbol matched phase-noise reconstruction block 210 comprises a XJ functional block 1402, a plurality of delay stages 1412, 1414, 1416, 1418, a first multiplier 1422 and a second multiplier 1424. The symbol matched phase-noise reconstruction block 210 further comprises a first output 1436 and a second output 1438. The symbol matched phase-noise reconstruction block 210 is employed to reconstruct the phase noise error by multiplying the hard decision symbol sent from the first phase deviation estimate block 202 with the interpolated phase deviation sent from the adaptive phase deviation FIR filter 208.

The XJ functional block 1402 is used to multiply the input signal at the first put 1432 by j, which is the square root of −1. The delay stage 1412 is used to compensate the gating latency. The delay stage 1414 is used to compensate the FIR filter latency. The delay stage 1416 is used to make up the total desired APNC process latency. The delay stage 1418 is used to compensate the computing latency of the adaptive FIR filter.

Figure 15:
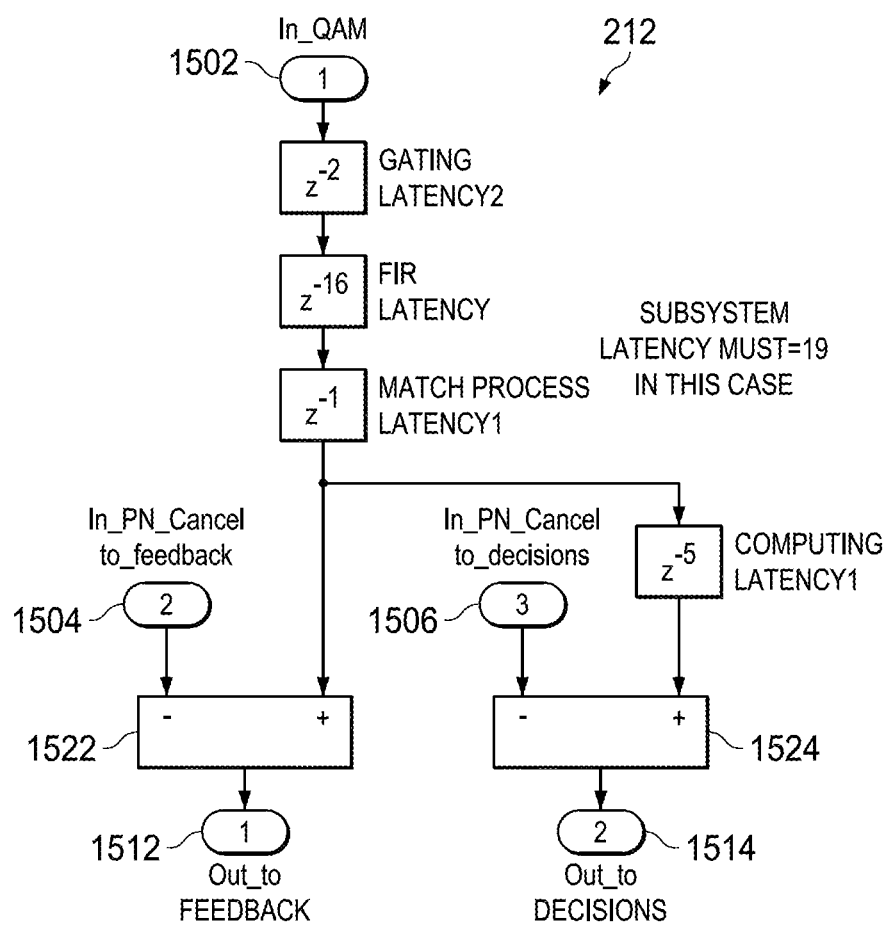
FIG. 15 illustrates a simplified schematic diagram of the symbol matched phase-noise cancellation block shown in FIG. 2 in accordance with various embodiments of the present disclosure.

FIG. 15 illustrates a simplified schematic diagram of the symbol matched phase-noise cancellation block shown in FIG. 2 in accordance with various embodiments of the present disclosure. As shown in FIG. 15, the symbol matched phase-noise cancellation block 212 comprises three inputs 1502, 1504 and 1506, and two outputs 1512 and 1514. A first input 1502 is used to receive an input symbol. A second input 1504 is used to receive a reconstructed phase-noise signal sent from the symbol matched phase-noise reconstruction block 210. A third input 1506 is used to receive a pertinent reconstructed phase-noise signal sent from the symbol matched phase-noise reconstruction block 210.

As shown in FIG. 15, the input symbol is sent to a positive input terminal of a first adder circuit 1522 through a plurality of delay stages such as the gating latency stage, the FIR latency stage and the Match-Process latency stage as shown in FIG. 15. The reconstructed phase-noise signal is sent to a negative input terminal of the first adder circuit 1522. A first cleaned-up output symbol is produced at the first output 1512 by subtracting the reconstructed phase-noise signal from the delayed input symbol. The first cleaned-up output symbol functions as a feedback signal.

The delayed input symbol at the positive input terminal of the first adder circuit 1522 is coupled to a positive input terminal of a second adder circuit 1524 through one additional delay stage (e.g., computing latency stage as shown in FIG. 15). A second cleaned-up output symbol is produced at the second output 1514 by subtracting the pertinent reconstructed phase-noise signal from the delayed input symbol. The second cleaned-up output symbol is used in the subsequent decision making process.

Figure 16:
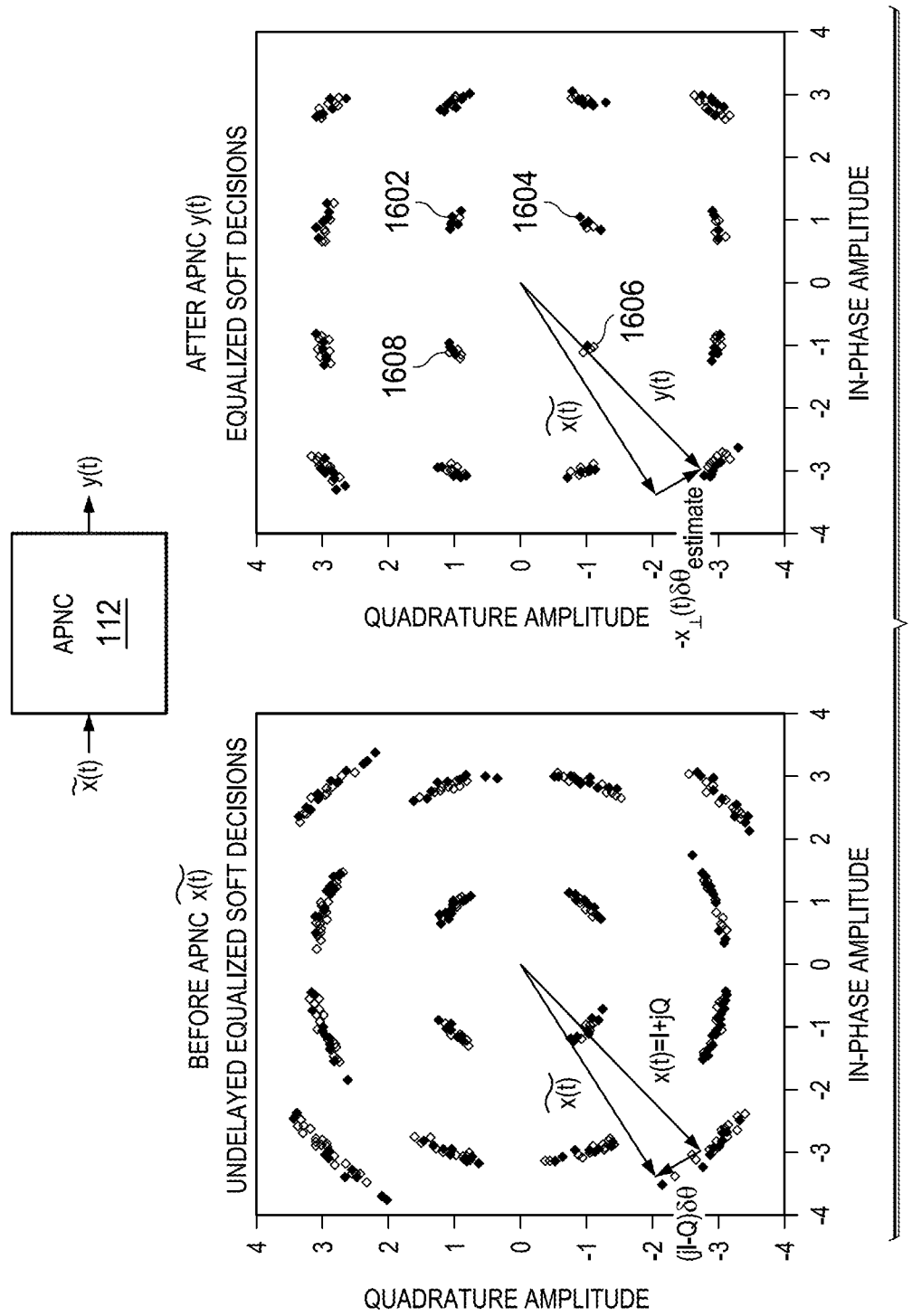
FIG. 16 illustrates an advantageous feature of employing the APNC shown in FIG. 1 in accordance with various embodiments of the present disclosure.

FIG. 16 illustrates an advantageous feature of employing the APNC shown in FIG. 1 in accordance with various embodiments of the present disclosure. In some embodiments, the APNC 112 is placed after a carrier de-rotation apparatus (e.g., PLL block shown in FIG. 1) and before a final hard-decision device in a QAM demodulator. It should be noted that the APNC 112 may be placed outside the carrier-recovery PLL loop of the QAM demodulator so as to avoid introducing additional latency associated with the PLL loop and equalizer. In some embodiments, the APNC 112 may be coupled between a parallel carrier de-rotation multiplier and a parallel decision quantizer.

As shown in FIG. 16, the left constellation diagram shows before entering the APNC 112, the symbols x̃(t) are of a larger phase-noise swing. On the other hand, after passing through the APNC 112, the right constellation diagram shows the symbols y(t) are of a much reduced phase-noise swing. Such a reduced phase-noise swing helps to reduce the decision errors of the QAM demodulator of the receiver 100.

One advantageous feature of having the APNC 112 is that APNC 112 helps to reduce the number of decision errors in a QAM demodulator. The reduced decision errors help decoders (e.g., Reed-Solomon decoders and the like) coupled to the APNC 112 completely correct the remaining errors. For example, in a QAM demodulator in a 60 GHz link, after the APNC 112 is employed, the raw BER is reduced from 9.47×

$10^{-4}$ to $9.47 \times 10^{-4}$. The RS (255, 239) BER is reduced from $2.107 \times 10^{-4}$ to $\ll 5.0 \times 10^{-7}$, or about 0. The average EVM of the QAM demodulator is reduced from −21.5 dBc to −26.6 dBc. The method of reducing phase noise embedded in the APNC 112 is mathematically described below with respect to FIGS. 17-21.

In sum, the APNC 112 helps to improve the margin against phase noise and phase-related nonlinearity. As a result, the BER of the receiver 100 may be reduced in the presence of high phase noise. Such a reduced BER may help to reduce the system cost by using less expensive RF components such as a low-cost oscillator, which may generate a large amount phase noise.

Furthermore, the APNC 112 operates independently. The APNC 112 does not affect the stable operation of the demodulator of the receiver 100. More particularly, the APNC 112 does not affect the stability of various feedback loops in the receiver 100.

Another advantageous feature of having the APNC 112 is that the APNC 112 may be combined with other noise elimination techniques such as pilot symbol based phase-noise elimination techniques and/or the like.

Figure 17:
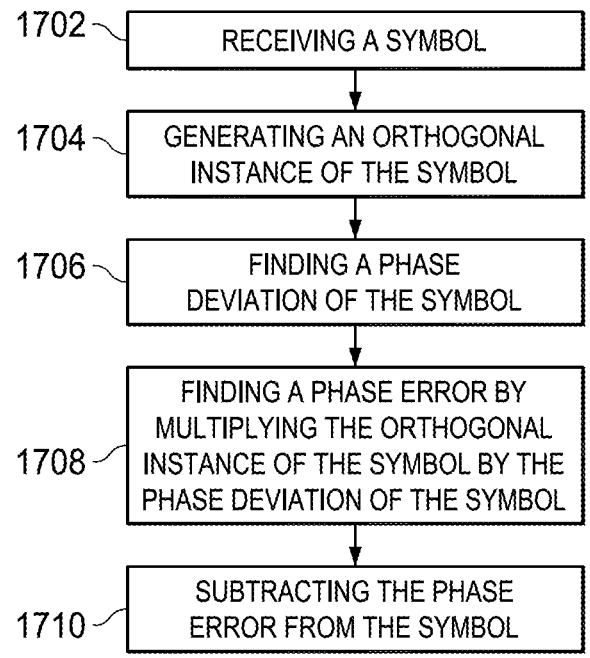
FIG. 17 illustrates a flow chart of a first phase-noise cancellation process in accordance with various embodiments of the present disclosure.

FIG. 17 illustrates a flow chart of a phase-noise cancellation process in accordance with various embodiments of the present disclosure. This flow chart in FIG. 17 is merely an example, which should not unduly limit the scope of the claims. One of ordinary skill in the art would recognize many variations, alternatives, and modifications. For example, various steps as illustrated in FIG. 17 may be added, removed, replaced, rearranged, repeated, overlapped, and/or partially overlapped.

At step 1702, the APNC 112 may receive a QAM symbol corrupted by phase-noise. The uncorrupted version of the received QAM symbol of a QAM demodulator may be expressed as:

$$x(t) = I + jQ \quad (2)$$

The phase-noise corrupted QAM symbol may be expressed as:

$$\tilde{x}(t) = (I + jQ) \cdot e^{j\delta\theta} \quad (3)$$

where $\delta\theta$ represents a phase deviation of the phase-noise corrupted QAM symbol.

The impact of the phase deviation of the phase-noise corrupted QAM symbol can be simplified as:

$$e^{j\delta\theta} = \cos(\delta\theta) + j\sin(\delta\theta) \approx 1 + j\delta\theta \quad (4)$$

where the approximation in Equation (4) is based upon $\delta\theta \ll 1$.

Equation (3) can be simplified through substitution. The impact of the phase deviation in Equation (3) can be replaced by the approximation in Equation (4). Equation (3) can be simplified as:

$$\tilde{x}(t) = x(t) \cdot (1 + j\delta\theta) = (I + jQ) + (jI - Q) \cdot \delta\theta \quad (5)$$

where $(jI - Q)\delta\theta$ is defined as phase noise. Alternatively, $(jI - Q)\delta\theta$ may be referred to as a phase-noise vector. Furthermore, $(jI - Q)\delta\theta$ may be alternatively referred to as the phase error of the phase-noise corrupted QAM symbol. It should be noted that $(jI - Q)$ is a corresponding orthogonal instance of the uncorrupted QAM symbol $I + jQ$. As a result, $(jI - Q)\delta\theta$ may also be referred to as an orthogonal phase-noise vector.

At step 1704, an orthogonal instance $x_\perp(t)$ of the uncorrupted QAM symbol $x(t)$ may be obtained by the following equation:

$$x_\perp(t) = jI - Q = jx(x) \quad (6)$$

A corresponding phase-noise corrupted orthogonal instance of the QAM symbol may be expressed as:

$$\tilde{x}_\perp(t) = x_\perp(t) \cdot (1 + j\delta\theta) = (jI - Q) - (I + jQ) \cdot \delta\theta \quad (7)$$

After a hard decision process is applied to the phase-noise corrupted symbol, a substantially uncorrupted symbol $x(t)$ may be obtained based upon the hard decision. In some embodiments, the hard decision process is a quantization process. A conjugate instance $x^*(t)$ of the $x(t)$ may be obtained through the CONJUGATE functional block 304 shown in FIG. 3.

At step 1706, the phase deviation of the phase-noise corrupted symbol may be obtained by the following equations. As shown in Equation (5) above, the phase-noise $(jI - Q)\delta\theta$ is aligned in the same direction as the orthogonal instance of the phase-noise corrupted QAM symbol given by Equation (5) above. This makes it possible to estimate the phase deviation based upon the following equation:

$$x^*(t) \cdot \tilde{x}_\perp(t) = j(I^2 + Q^2) - (I^2 + Q^2) \cdot \delta\theta \quad (8)$$

It should be noted that an estimate of the phase deviation may be obtained by taking the ratio of the real and imaginary parts of the result shown in Equation (8). The estimate of the phase deviation may be expressed as:

$$\delta\theta_{estimate} = \frac{-\mathrm{Re}\{x^*(t) \cdot \tilde{x}_\perp(t)\}}{\mathrm{Im}\{x^*(t) \cdot \tilde{x}_\perp(t)\}} \quad (9)$$

Referring back to FIG. 3, the first phase deviation estimate block 202 is capable of generating the phase deviation shown in Equation (9) based upon a QAM symbol. It should be noted that while the first phase deviation estimate block 202 receives a phase-noise corrupted symbol $\tilde{x}(t)$, the output of the QUANTIZE_QAM 302 is an estimate of the uncorrupted symbol $x(t)$ since the QUANTIZE_QAM 302 is capable of performing a hard decision based upon the phase-noise corrupted symbol $\tilde{x}(t)$, especially when $x(t)$ is an inner symbol.

The CONJUGATE functional block 304 shown in FIG. 3 receives the uncorrupted symbol $x(t)$ from the QUANTIZE_QAM 302 and generates the conjugate instance $x^*(t)$. The orthogonal instance $\tilde{x}_\perp(t)$ of the phase-noise corrupted symbol $\tilde{x}(t)$ may be obtained through the XJ functional block 306 shown in FIG. 3.

The structure and operational principle of the first phase deviation estimate block 202 have been described above with respect to FIG. 3, and hence are not discussed again in further detail to avoid unnecessary repetition.

At step 1708, a cleaned-up output symbol $y(t)$ may be obtained by multiplying the orthogonal symbol $x_\perp(t)$ with the estimate of the phase deviation $\delta\theta_{estimate}$ to create a phase error and subtracting the phase error from the phase-noise corrupted symbol $\tilde{x}(t)$ in step 1710. The process is summarized by the following equations:

$$y(t) = \tilde{x}(t) - x_\perp(t) \cdot \delta\theta_{estimate} \quad (10)$$

$$y(t) = (I + jQ) + (jI - Q) \cdot \delta\theta_{estimate} \quad (11)$$

Referring back to FIG. 2, FIG. 14 and FIG. 15, the phase deviation $\delta\theta_{estimate}$ in Equation (10) is generated by the first phase deviation estimate block 202. After flowing through a plurality of filtering stages such as the inner symbol selection and gating block 204, the random interpolator functional block 206 and the adaptive phase deviation FIR filter 208, the phase deviation $\delta\theta_{estimate}$ is fed into the second input 1434 of the symbol matched phase-noise reconstruction block 210.

The orthogonal symbol $x_\perp(t)$ in Equation (10) is generated by the XJ functional block 1402 of FIG. 14. The orthogonal symbol $x_\perp(t)$ is multiplied by the phase deviation $\delta\theta_{estimate}$ in the symbol matched phase-noise reconstruction block 210.

In the symbol matched phase-noise cancellation block 212, the phase-noise corrupted symbol $\tilde{x}(t)$ is fed into the first input 1502. The phase error $x_\perp(t) \cdot \delta\theta_{estimate}$ is fed into the third input 1506. Through the adder 1524 shown in FIG. 15, the cleaned-up output symbol $y(t)$ may be obtained at the second output 1514 of FIG. 15.

It should be noted that the method described above may not be applicable to outer symbols because there may be an error in the hard decision used for obtaining $x(t)$ and $x_\perp(t)$. For the outer symbols, the phase deviation may be estimated based upon the phase deviation of inner symbols through an interpolation process. The inner symbols of a 16-QAM constellation diagram are constellation points 1602, 1604, 1606 and 1608 shown in FIG. 16.

In some embodiments, an inner symbol of a QAM constellation may be used to estimate the phase deviation $\delta\theta$ in an input constellation. The phase deviation $\delta\theta$ can then be interpolated as $\delta\theta_{estimate}$ and applied to all symbols including the outer symbols.

It should be noted that in some embodiments in Equation (10) above the cleaned-up output symbol $y(t)$ may be obtained based upon $x_\perp(t)$. In alternative embodiments, $x_\perp(t)$ in Equation (10) may be replaced by $\tilde{x}_\perp(t)$. It should be noted that $\tilde{x}_\perp(t)$ in Equation (10) may lead to a slight error due to second-order effects generated from $\delta\theta_{estimate}$ multiplied by $\tilde{x}_\perp(t)$. It should further be noted that such a replacement ($x_\perp(t)$ replaced by $\tilde{x}_\perp(t)$) still requires a correct hard decision of an incoming symbol and calculates the conjugate $x^*(t)$ based upon the correct decision of the incoming inner symbol.

Figure 18:
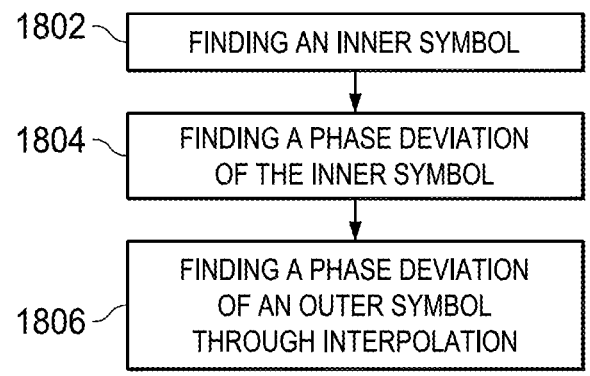
FIG. 18 is a flow chart illustrating in detail the step 1706 shown in FIG. 17 in accordance with various embodiments of the present disclosure.

FIG. 18 is a flow chart illustrating in detail the step 1706 shown in FIG. 17 in accordance with various embodiments of the present disclosure. This flow chart in FIG. 18 is merely an example, which should not unduly limit the scope of the claims. One of ordinary skill in the art would recognize many variations, alternatives, and modifications. For example, various steps as illustrated in FIG. 18 may be added, removed, replaced, rearranged, repeated, overlapped, and/or partially overlapped.

At step 1802, the APNC 112 may receive a plurality of symbols. The inner-most symbols are not prone to phase errors. In accordance with some embodiments, without having the APNC 112 to filter the phase noise of incoming symbols, the inner symbols of the constellation are error-free. In other words, the hard decision process may correctly decide the inner symbols. In some embodiments, the inner symbols may be symbols 1602, 1604, 1606 and 1608 as shown in FIG. 16. As shown in FIG. 16, the inner symbols may satisfy the following condition:

$$I^2 = Q^2 \quad (12)$$

where I is the real part of an inner symbol and Q is the imaginary part of the inner symbol. It should be noted that for simplicity, only inner symbols are discussed herein. One skilled in the art would recognize other symbols such as outer symbols may be selected if outer symbols satisfy Equation (12). It should further be noted that in some alternative embodiments, Equation (12) includes the situation that $I^2$ is approximately equal to $Q^2$.

The inner symbols may be selected by the following condition:

$$(I^2 + Q^2) < 2\left(\frac{d_{min}}{2}\right)^2 \quad (13)$$

where $d_{min}$ is the minimum decision distance between symbols. It should be noted that $d_{min}$ used in the previous example are selected purely for demonstration purposes and are not intended to limit the various embodiments of the present invention to any particular thresholds. Other thresholds may also be used depending on different applications (e.g., different constellations).

At step 1804, the decision process of a QAM demodulator is able to correctly determine $x^*(t)$ of a phase-noise corrupted inner symbol. Based upon Equation (9), the phase deviation of the phase-noise corrupted inner symbol may be obtained. It should be noted the result shown in Equation (9) should be divided by 2 if Equation (12) is used to gate the inner symbols. It should further be noted that even if some symbols are not gated, Equation (12) may be satisfied in an average manner after a variety of filtering processes such as random interpolation processes, adaptive FIR filtering processes and/or the like are applied to these symbols.

At step 1806, the phase deviation of a corresponding outer symbol may be obtained through an interpolation process in which the estimate of the phase deviations of the outer symbols may be calculated based upon the phase deviations of the inner symbols. The interpolation process may be carried out in the random phase interpolator functional block 206 shown in FIG. 2 and FIG. 9.

After the phase deviation of the outer symbol have been obtained, the phase error of the outer symbols may be eliminated by the following equation:

$$y(t) = \tilde{x}(t) - \tilde{x}_\perp(t) \cdot \delta\theta_{estimate} \quad (14)$$

It should be noted that Equation (14) is similar to Equation (10) except that $x_\perp(t)$ in Equation (10) is replaced by $\tilde{x}_\perp(t)$. As described above, during a noise elimination process, $x_\perp(t)$ in Equation (10) may be replaced by $\tilde{x}_\perp(t)$ with usually negligible high-order effects (e.g., a second-order effect) on the precision of the phase-error elimination.

In comparison with conventional phase-noise elimination processes such as pilot symbol based phase-noise elimination processes, the method described above is advantageous because the total number of inner symbols of a QAM demodulator is more than the total number of pilot symbols that would typically be employed in the conventional phase-noise elimination processes.

Figure 19:
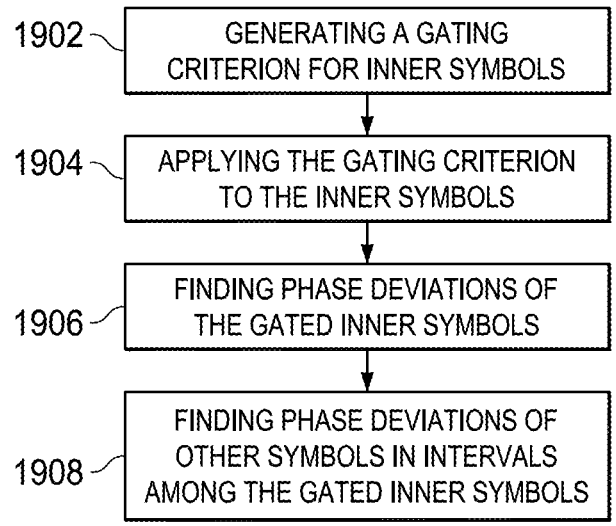
FIG. 19 is a flow chart illustrating in detail the step 1806 shown in FIG. 18 in accordance with various embodiments of the present disclosure.

FIG. 19 is a flow chart illustrating in detail the step 1806 shown in FIG. 18 in accordance with various embodiments of the present disclosure. This flow chart in FIG. 19 is merely an example of the detailed implementation of the step 1806 shown in FIG. 18 above, which should not unduly limit the scope of the claims. One of ordinary skill in the art would recognize many variations, alternatives, and modifications. For example, various steps as illustrated in FIG. 19 may be added, removed, replaced, rearranged, repeated, overlapped, and/or partially overlapped.

At step 1902, a gating criterion is selected. In some embodiments, the gating criterion may be selected based upon Equation (12) and/or Equation (13) above. At step 1904, the gating criterion is applied to the incoming symbols to obtain gated symbols. Alternatively, after the gating criterion has been applied to the incoming symbols, inner symbols may be selected as a result. An orthogonal instance of an incoming symbol may be obtained through the XJ functional block 306 shown in FIG. 3. At step 1906, a phase deviation of the inner symbol may be calculated based upon Equation (9) or the square of the gated symbol. Furthermore, the phase deviation may be forward-interpolated in the random interpolator functional block 206 shown in FIG. 2 and FIG. 9.

Alternatively, the phase deviation of the inner symbol may be calculated based upon the square of the orthogonal instance of the gated symbol. The square of the orthogonal instance of the gated symbol may be expressed as:

$$\tilde{x}_\perp^2(t) = (Q^2-I^2)(1-(\delta\theta)^2) + 4IQ\delta\theta - j2[(I^2-Q^2)\delta\theta + IQ(1-(\delta\theta)^2)] \quad (15)$$

According to Equation (12), the gated symbol may satisfy $I^2 = Q^2$. It should be noted the square of the in-phase component is approximately equal to, or within a set margin of, the square of the quadrature component because the gated symbol is not quantized yet and includes phase-noise corrupted portion.

It should be noted Equation (15) may be applicable to other symbols. For example, some symbols are not gated. $I^2 = Q^2$ may be satisfied in an average manner after a variety of filtering processes such as random interpolation processes, adaptive FIR filtering processes and/or the like are applied to these symbols.

Equation (15) may be simplified through substitution. Then, the phase deviation $\delta\theta_{estimate}$ may be expressed as:

$$\delta\theta_{estimate} = \left(\frac{-1}{2}\right)\frac{\text{Re}\{\tilde{x}_\perp^2(t)\}}{\text{Im}\{\tilde{x}_\perp^2(t)\}} \quad (16)$$

At step 1908, for some symbols with $I^2 \neq Q^2$, the phase deviation may be obtained through an interpolation process. More particularly, $\delta\theta_{estimate}$ in Equation (16) may be sent to an interpolator such as the random interpolator functional block 206 shown in FIG. 2. The interpolator may generate a phase deviation $\underline{\delta\theta}_{estimate}$ for the symbols with $I^2 \neq Q^2$. Furthermore, $\tilde{x}_\perp(t)\underline{\delta\theta}_{estimate}$ in Equation (14) may be expressed as the following equation:

$$\tilde{x}_\perp(t)\cdot\underline{\delta\theta}_{estimate} = (jI-Q)\cdot\underline{\delta\theta}_{estimate} - (I+jQ)\cdot\delta\theta\cdot\underline{\delta\theta}_{estimate} \quad (17)$$

After ignoring the second-order effects of $\delta\theta\underline{\delta\theta}_{estimate}$, Equation (17) may be simplified as:

$$\tilde{x}_\perp(t)\cdot\underline{\delta\theta}_{estimate} = (jI-Q)\cdot\underline{\delta\theta}_{estimate} \quad (18)$$

A clean symbol may be obtained after substituting Equation (18) into Equation (14). After substitution, Equation (14) is simplified as:

$$y(t) = \tilde{x}(t) - (jI-Q)\cdot\underline{\delta\theta}_{estimate} \quad (19)$$

In sum, the phase-noise elimination process comprises selecting symbols with $I^2 = Q^2$, calculating phase deviations based upon Equation (16), calculating the phase deviations of symbols with $I^2 \neq Q^2$ based upon an interpolation process and eliminating phase error based upon Equation (19).

It should be noted that during the interpolation process, the interpolation intervals are random and thermal noise also corrupts the phase-deviation estimates as it varies with link conditions. In order to obtain a better estimate of the phase deviations of the symbols with $I^2 \neq Q^2$, an adaptive filtering mechanism may be employed.

Figure 20:
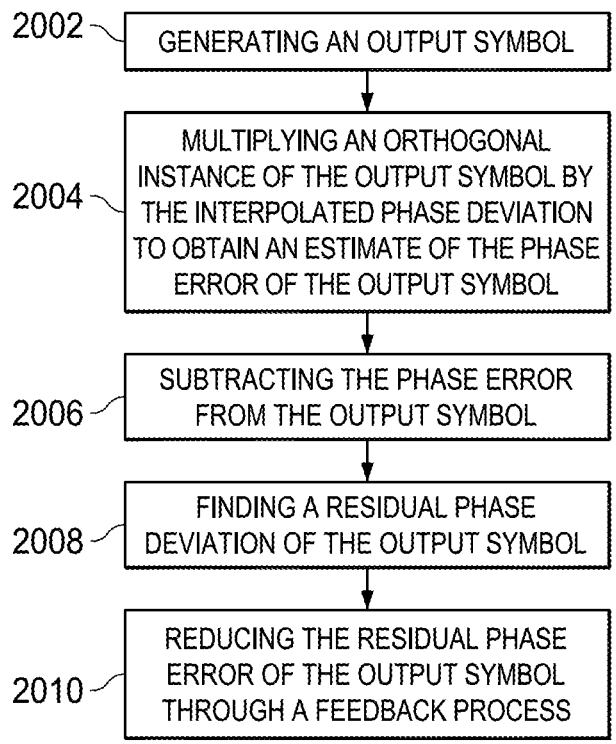
FIG. 20 illustrates a flow chart of a feedback process in accordance with various embodiments of the present disclosure.

FIG. 20 illustrates a flow chart of a feedback process in accordance with various embodiments of the present disclosure. This flow chart in FIG. 20 is merely an example, which should not unduly limit the scope of the claims. One of ordinary skill in the art would recognize many variations, alternatives, and modifications. For example, various steps as illustrated in FIG. 20 may be added, removed, replaced, rearranged, repeated, overlapped, and/or partially overlapped.

At step 2002, in order to drive the adaptive interpolating filter so that it minimizes the content of phase-noise in the output, the output of the APNC 112 may be sent back into the APNC 112 through a feedback control loop. The output symbol is defined as $\tilde{y}(t)$ to show the output symbol is slightly corrupted by residual phase noise. In some embodiments, $\tilde{y}(t)$ may be given by the following equations:

$$\tilde{y}(t) = \tilde{x}(t) - \tilde{x}_\perp(t)\cdot\underline{\delta\theta} \quad (20)$$

$$\tilde{y}(t) = (I+jQ) + (jI-Q)\cdot\delta\theta - (jI-Q)\cdot\underline{\delta\theta} - (I+jQ)\cdot\delta\theta\cdot\underline{\delta\theta} \quad (21)$$

In order to clearly show the difference between an initial phase deviation and a correcting phase deviation in the output, Equation (21) may be rewritten as:

$$\tilde{y}(t) = (I+jQ)(1-\delta\theta\cdot\underline{\delta\theta}) + (jI-Q)(\delta\theta-\underline{\delta\theta}) \quad (22)$$

Equation (22) may be simplified by neglecting the second-order effect. After removing the second-order effect from Equation (22), $\tilde{y}(t)$ may be given by the following equation:

$$\tilde{y}(t) = (I+jQ) + (jI-Q)(\delta\theta-\underline{\delta\theta}) \quad (23)$$

At step 2004, an estimate phase error of the output symbol $\tilde{y}(t)$ may be obtained by multiplying an orthogonal instance of the output symbol with an interpolated phase deviation. The interpolated phase deviation may be obtained in step 1908 shown in FIG. 19. At step 2006, a clean output symbol may be obtained by subtracting the estimate phase error from the output symbol.

In order to better eliminate phase deviation, a feedback loop may be employed. In particular, the phase deviation of $\tilde{y}(t)$ may be sent to an input of the adaptive filter. Through the feedback loop, the phase deviation of $\tilde{y}(t)$ is reduced to a minimum value. The phase deviation of $\tilde{y}(t)$ may be obtained through a process similar to that shown in Equation (8). In other words, the phase deviation of $\tilde{y}(t)$ may be obtained in the following equation in which the orthogonal instance of the output symbol $\tilde{y}(t)$ is multiplied by of the conjugate of the quantized output symbol $y(t)$. The quantized output symbol $y(t)$ may be obtained through a hard decision process applied to $\tilde{y}(t)$. The product of the multiplication is expressed as:

$$y^*(t)\cdot\tilde{y}_\perp(t) = j(I^2+Q^2) - (I^2+Q^2)(\delta\theta-\underline{\delta\theta}) \quad (24)$$

At step 2006, the residual phase deviation at the output of APNC 112 may be obtained by taking the ratio of the real and imaginary parts of the result shown in Equation (24). The residual phase deviation may be expressed as:

$$\delta\theta - \underline{\delta\theta} = \frac{-\text{Re}\{y^*(t)\cdot\tilde{y}_\perp(t)\}}{\text{Im}\{y^*(t)\cdot\tilde{y}_\perp(t)\}} \quad (25)$$

As shown in Equation (25), $\delta\theta-\underline{\delta\theta}$ is obtained as the negative ratio of the real part and the imaginary part in Equation (24). $\delta\theta-\underline{\delta\theta}$ is the estimate of the remaining or residual phase deviation at the output of the APNC 112.

At step 2008, in order to improve the noise elimination accuracy of the APNC 112, the estimate of the residual phase deviation $\delta\theta-\underline{\delta\theta}$ may be sent back to the adaptive phase deviation FIR filter 208 in which $\delta\theta-\underline{\delta\theta}$ is reduced to approximately zero through a feedback control process as shown in step 2010. In other words, the feedback control process in step 2010 helps to reduce the residual phase error of the output symbol.

It should be noted the implementation of step 2006 of FIG. 20 may vary depending different applications and design needs. For example, in step 2006 of FIG. 20, the conjugate y*(t) of the output symbol may be replaced by a conjugate x*(t) of the input symbol. More particularly, the conjugate y*(t) of the output symbol in Equation (24) may be replaced by the conjugate x*(t) of the input symbol. In some embodiments, x*(t) is the conjugate of a delayed hard decision on the input symbol x(t). y*(t) replaced by x*(t) may yield the same result providing there are no errors in the hard decisions x(t). The replacement may be expressed as:

$$x^*(t) \cdot \tilde{y}_\perp(t) = j(I^2+Q^2) - (I^2+Q^2)(\delta\theta - \underline{\delta\theta}) \quad (26)$$

It should be noted a correct hard decision is still necessary. For example, in a process without having a correct hard decision, x*(t) shown in Equation (26) may be replaced by a corresponding noise corrupted symbol $\tilde{x}^*(t)$. Multiplying the orthogonal output symbol $\tilde{y}_\perp(t)$ by the corresponding noise corrupted symbol $\tilde{x}^*(t)$ may yield the following equations:

$$\tilde{x}^*(t) \cdot \tilde{y}_\perp(t) = [(I-jQ)+(-jI-Q)\delta\theta] \cdot [(I+jQ)+(jI-Q)(\delta\theta-\underline{\delta\theta})] \quad (27)$$

The real part of $\tilde{x}^*(t) \cdot \tilde{y}_\perp(t)$ shown in Equation (27) may be expressed as:

$$Re(\tilde{x}^*(t) \cdot \tilde{y}_\perp(t)) = (I^2+Q^2) + (I^2+Q^2)\delta\theta(\delta\theta-\underline{\delta\theta}) \quad (28)$$

The imaginary part of $\tilde{x}^*(t) \cdot \tilde{y}_\perp(t)$ shown in Equation (27) may be expressed as:

$$Im(\tilde{x}^*(t) \cdot \tilde{y}_\perp(t)) = (I^2+Q^2)(\delta\theta-\underline{\delta\theta}) - (I^2+Q^2)\delta\theta \quad (29)$$

After omitting higher order terms in phase deviation such as the second order term in the real part, Equation (27) may be simplified as:

$$\tilde{x}^*(t) \cdot \tilde{y}_\perp(t) = (j\underline{\delta\theta})(I^2+Q^2) + (I^2+Q^2) \quad (30)$$

It should be noted that Equation (30) above does not provide the information related to the remaining phase deviation $\delta\theta-\underline{\delta\theta}$. In other words, the corresponding noise corrupted symbol $\underline{x}^*(t)$ in Equation (27) does not help to produce the remaining phase deviation $\delta\theta-\underline{\delta\theta}$. Instead, a hard-decision-based x*(t) is necessary in order to obtain the remaining phase deviation $\delta\theta-\underline{\delta\theta}$.

In sum, the method described above updates at all times because it gets interpolated samples from the gating and interpolation blocks, and it generates samples of $\underline{\delta\theta}$ at all times, for every input and output symbol, based on past and preceding samples in the FIR filter (adaptive predictor) memory (symbol-spaced delay line).

Figure 21:
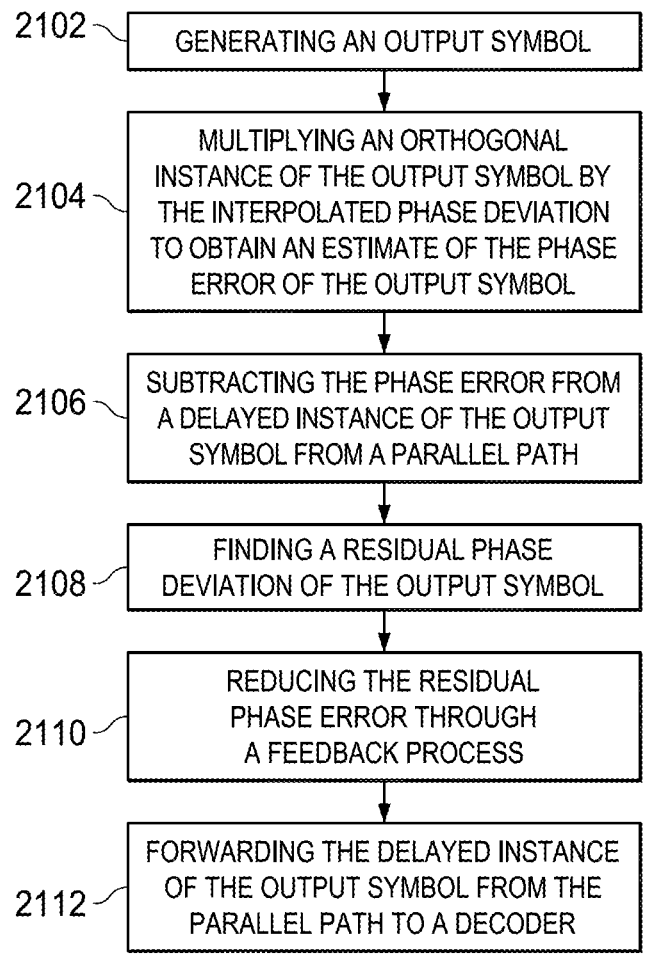
FIG. 21 illustrates a flow chart of an output process in accordance with various embodiments of the present disclosure.

FIG. 21 illustrates a flow chart of an output process in accordance with various embodiments of the present disclosure. This flow chart in FIG. 21 is merely an example, which should not unduly limit the scope of the claims. One of ordinary skill in the art would recognize many variations, alternatives, and modifications. For example, various steps as illustrated in FIG. 21 may be added, removed, replaced, rearranged, repeated, overlapped, and/or partially overlapped The steps (e.g., steps 2102, 2104, 2108 and 2110) shown in FIG. 21 are similar to the steps shown in FIG. 20 except steps 2106 and 2112. At step 2106, in order to better match the symbol from the feedback process including a variety of computing stages, the output symbol is delayed in a parallel path, and then the phase error is subtracted from the delayed instance of the output symbol. At step 2112, the APNC may forward the delayed instance of the output symbol to a decoder. The decoder may comprise a quantizer, a hard-decision device and/or the like.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
receiving, by an adaptive phase-noise cancellation apparatus, an incoming symbol from a receiver;
performing a hard decision process on the incoming symbol to generate a corresponding clean instance of the incoming symbol;
generating a conjugate instance of the corresponding clean instance;
generating an orthogonal instance of the incoming symbol;
multiplying the orthogonal instance of the incoming symbol by the conjugate instance of the corresponding clean instance to generate an intermediate component; and
calculating a phase deviation of the incoming symbol based upon a complex representation of the intermediate component.

2. The method of claim 1, wherein:
the phase deviation is a deviation in phase between the incoming symbol and the corresponding clean instance.

3. The method of claim 1, wherein:
the step of calculating includes calculating the phase deviation of the incoming symbol based upon a real part of the intermediate component divided by an imaginary part of the intermediate component.

4. The method of claim 1, wherein:
the incoming symbol is gated by a gating criterion to generate a gated symbol, wherein the gating criterion is an inner symbol, or a symbol having a square of a real part equal to a square of an imaginary part.

5. The method of claim 1, further comprising:
performing the hard decision process on a plurality of incoming symbols including outer symbols:
producing the corresponding clean instance of an incoming symbol;
generating an orthogonal instance of the corresponding clean instance of the incoming symbol;
generating a phase deviation of the incoming symbol using an interpolating process applied to phase deviations of adjacent inner symbols
generating a phase error by multiplying the orthogonal instance of the corresponding clean instance by the phase deviation of the incoming symbol; and
subtracting the phase error from the incoming symbol at an output of the adaptive phase-noise cancellation apparatus.

6. The method of claim 1, further comprising:
generating an orthogonal instance of the incoming symbol;
generating a phase error by multiplying the orthogonal instance of the incoming symbol by the phase deviation of the incoming symbol; and subtracting the phase error from the incoming symbol to form a phase-corrected output symbol at an output of the adaptive phase-noise cancellation apparatus.

7. The method of claim 4, further comprising:
generating a phase deviation of an outer symbol using an interpolating process applied to phase deviations of adjacent gated symbols.

8. The method of claim 6, further comprising:
performing a feedback process on the phase-corrected output symbol.

9. The method of claim 8, further comprising:
performing the hard decision process on an output symbol of the adaptive phase-noise cancellation apparatus to produce a clean output symbol;
generating a conjugate instance of the clean output symbol;
generating an orthogonal instance of the output symbol;
multiplying the orthogonal instance of the output symbol by the conjugate instance of the clean output symbol to generate an output intermediate component;
calculating an output phase deviation based upon a real part and an imaginary part of the output intermediate component; and
reducing the output phase deviation through the feedback process.

10. The method of claim 8, further comprising:
performing the hard decision process on an input symbol of the adaptive phase-noise cancellation apparatus to produce a clean input symbol;
generating a conjugate instance of the clean input symbol;
generating an orthogonal instance of an output symbol;
multiplying the orthogonal instance of the output symbol by the conjugate instance of the clean input symbol to generate an output intermediate component;
calculating an output phase deviation based upon a real part and an imaginary part of the output intermediate component; and
reducing the output phase deviation through the feedback process.

11. An apparatus comprising:
a first phase deviation estimate block configured to:
receive a phase-noise corrupted symbol;
generate a phase deviation of the phase-noise corrupted symbol at a first output of the first phase deviation estimate block; and
generate a hard decision instance of the phase-noise corrupted symbol at a second output of the first phase deviation estimate block;
a symbol matched noise reconstruction block having inputs coupled to the first phase deviation estimate block, wherein the symbol matched noise reconstruction block is configured to:
generate an orthogonal instance of the hard decision instance of the phase-noise corrupted symbol; and
generate a phase-noise component by multiplying the orthogonal instance of the hard decision instance of the phase-noise corrupted symbol by the phase deviation of the phase-noise corrupted symbol; and
a symbol matched phase-noise cancellation block having a first input configured to receive the phase-noise corrupted symbol and a second input coupled to an output of the symbol matched noise reconstruction block, wherein the symbol matched noise cancellation block is configured to subtract the phase-noise component from the phase-noise corrupted symbol.

12. The apparatus of claim 11, further comprising:
an inner symbol selection and gating block having a first input configured to receive the phase deviation of the phase-noise corrupted symbol and a second input configured to receive the hard decision instance of the phase-noise corrupted symbol; and
an interpolator coupled to the inner symbol selection and gating block.

13. The apparatus of claim 11, wherein:
the phase-noise corrupted symbol is a sixteen quadrature amplitude modulation (QAM) symbol.

14. The apparatus of claim 12, wherein:
the inner symbol selection and gating block is configured to pass a symbol having a squared magnitude below a threshold, and wherein the threshold is based upon a squared magnitude of an inner symbol; and
the interpolator is configured to derive a phase deviation of an outer symbol from phase deviations of a plurality of inner symbols.

15. The apparatus of claim 12, further comprising:
an adaptive filter coupled between the interpolator and the symbol matched noise reconstruction block, wherein the adaptive filter comprises:
a first input coupled to the interpolator;
a second input coupled to a feedback device; and
an output coupled to the symbol matched noise reconstruction block.

16. The apparatus of claim 15, wherein:
the feedback device comprises an input coupled to an output of the symbol matched noise cancellation block and an output coupled to the adaptive filter through a plurality of gain stages and delay stages, and wherein the feedback device is configured to:
receive an output symbol from the symbol matched noise cancellation block; and
generate a phase deviation of the output symbol at the output of the feedback device.

17. A method comprising:
receiving, by an adaptive phase-noise cancellation apparatus, an inner symbol from a receiver, wherein the adaptive phase-noise cancellation apparatus is part of a quadrature amplitude modulation (QAM) demodulator of the receiver;
generating an orthogonal instance $\tilde{x}_\perp(t)$ of the inner symbol;
generating a conjugate instance $x^*(t)$ of a quantized inner symbol; and
calculating a phase deviation of the inner symbol according to:

$$\delta\theta_{estimate} = \frac{-\text{Re}\{x^*(t) \cdot \tilde{x}_\perp(t)\}}{\text{Im}\{x^*(t) \cdot \tilde{x}_\perp(t)\}}$$

where $\delta\theta_{estimate}$ is the phase deviation, the inner symbol is selected according to a gating criterion GC, wherein the gating criterion is generated base upon a magnitude squared of the inner symbol.

18. The method of claim 17, further comprising:
generating a phase deviation of an outer symbol using an interpolating process applied to phase deviations of a plurality of inner symbols.

19. The method of claim 17, further comprising:
finding a gated symbol having a real part I equal to an imaginary part Q, and wherein the gated symbol is selected according to a gating criterion that $I^2$ is approximately equal to $Q^2$, and wherein the gating criterion is satisfied by applying a gating process to an incoming symbol to generate the gated symbol or in an average manner after a plurality of filtering processes are applied to a plurality of gated symbols, and wherein a phase deviation of the gated symbol is calculated according to:

$$\delta\theta_{estimate} = \left(\frac{-1}{2}\right)\frac{\text{Re}\{\tilde{x}_\perp^2(t)\}}{\text{Im}\{\tilde{x}_\perp^2(t)\}}.$$

20. The method of claim 18, further comprising:
generating an interpolated phase deviation for a symbol based upon the phase deviations of the plurality of inner symbols;
generating an orthogonal instance of the symbol;
generating a phase error of the symbol by multiplying the orthogonal instance of the symbol by the interpolated phase deviation of the symbol; and
subtracting the phase error from the symbol at an output of the adaptive phase-noise cancellation apparatus.

21. The method of claim 20, further comprising:
performing a feedback process on the phase deviation of the symbol.

22. The method of claim 21, further comprising:
performing a hard decision process on an output symbol of the adaptive phase-noise cancellation apparatus to produce a clean output symbol;
generating a conjugate instance of the clean output symbol;
generating an orthogonal instance of the output symbol;
multiplying the orthogonal instance of the output symbol by the conjugate instance of the clean output symbol to generate an output intermediate component;
calculating an output phase deviation based upon a real part and an imaginary part of the output intermediate component; and
reducing the output phase deviation through the feedback process.

23. The method of claim 22, further comprising:
performing the hard decision process on an input symbol of the adaptive phase-noise cancellation apparatus to produce a clean input symbol;
generating a conjugate instance of the clean input symbol;
generating an orthogonal instance of the output symbol;
multiplying the orthogonal instance of the output symbol by the conjugate instance of the clean input symbol to generate an output intermediate component;
calculating an output phase deviation based upon a real part and an imaginary part of the output intermediate component; and
reducing the output phase deviation through the feedback process.

* * * * *